Figure 1:
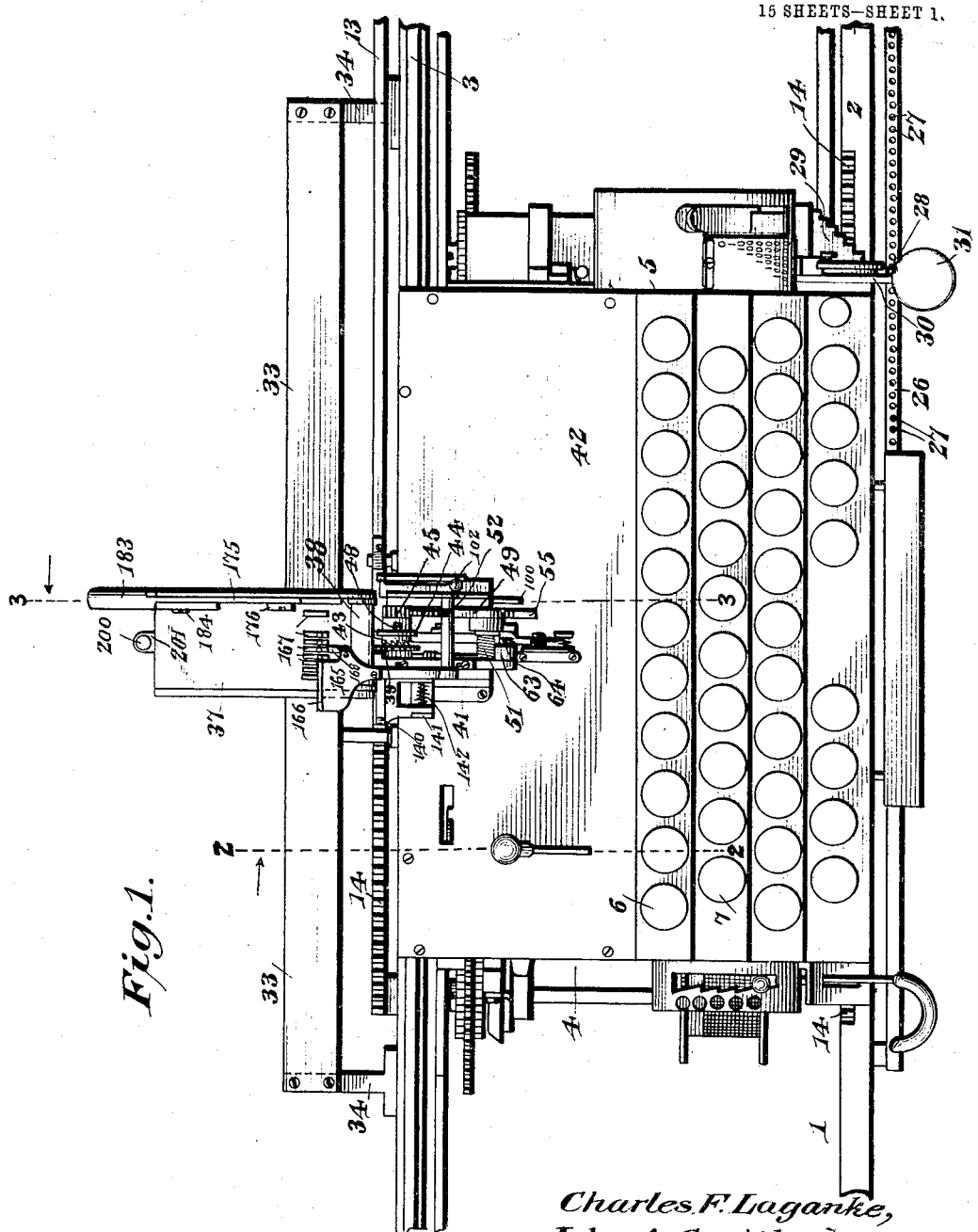

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.
15 SHEETS—SHEET 1.

Charles F. Laganke,
John A. Smith, Inventors

Witnesses
Jas. F. McCathran
Louis G. Julihn

By
C. G. Siggers
Attorney

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.

15 SHEETS—SHEET 2.

Witnesses
Jas. E. McCathran
Louis Gulihn

Charles F. Laganke,
John A. Smith, Inventors

By E. G. Siggers
Attorney

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.

15 SHEETS—SHEET 3.

Charles F. Laganke,
John A. Smith, Inventors

Witnesses
Jas. K. McCathran
Louis G. Julihn

By C. G. Siggers
Attorney

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.
15 SHEETS—SHEET 4.
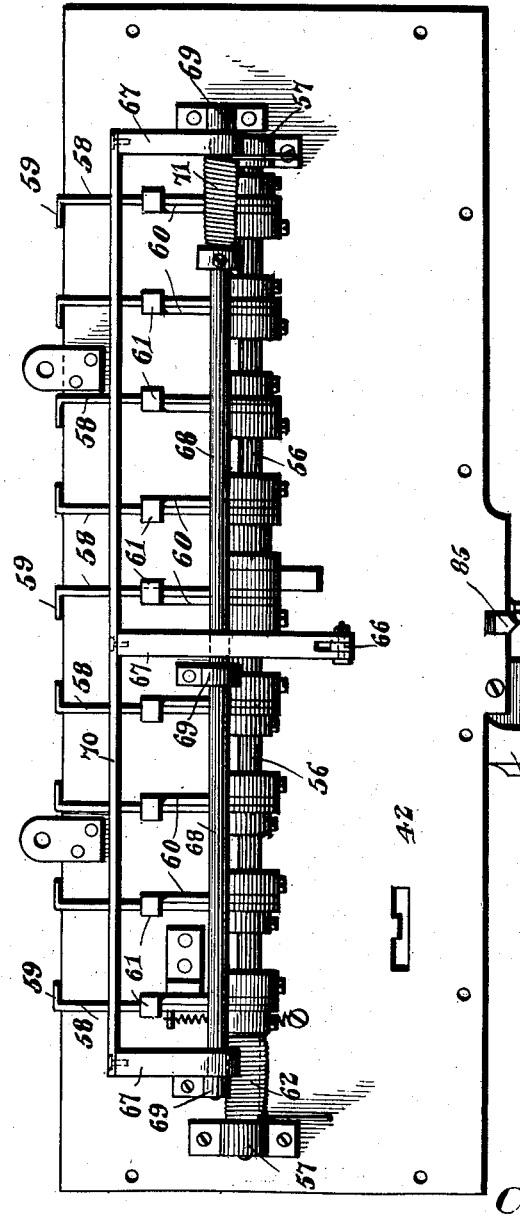
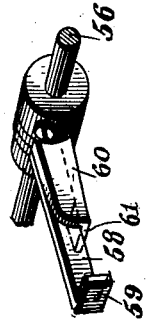
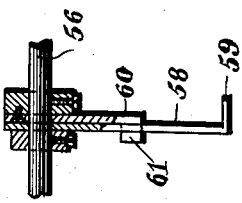
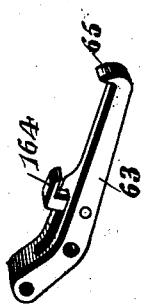
Charles F. Laganke,
John A. Smith, Inventors
Witnesses

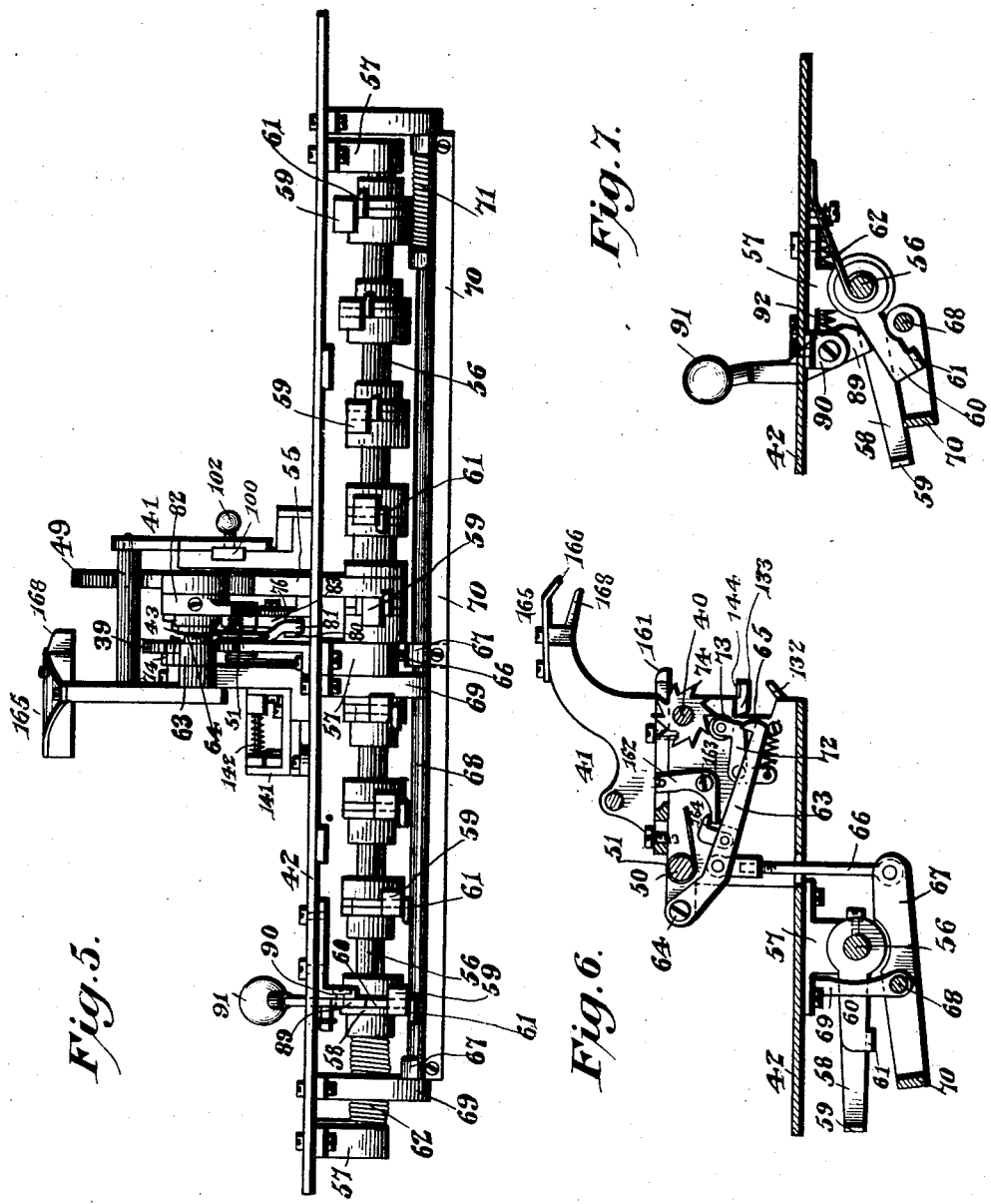

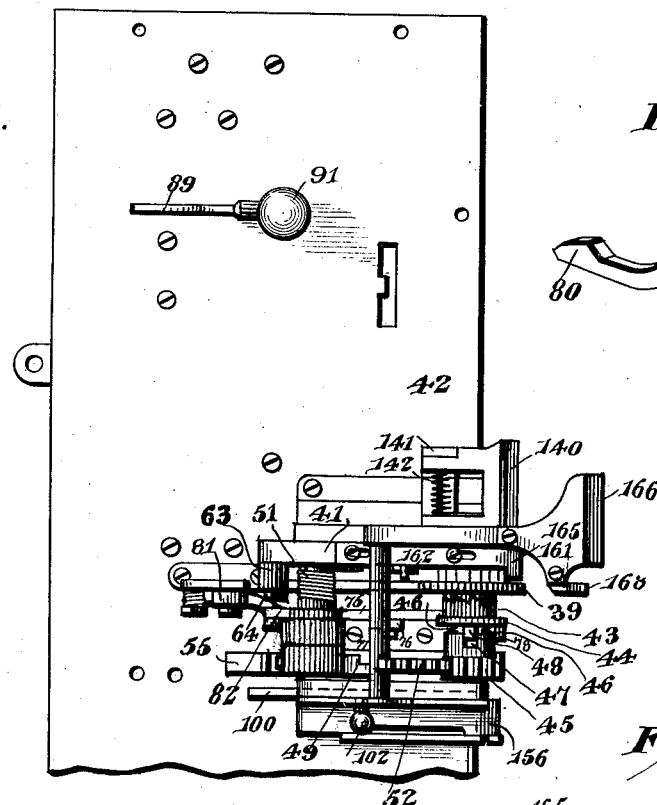
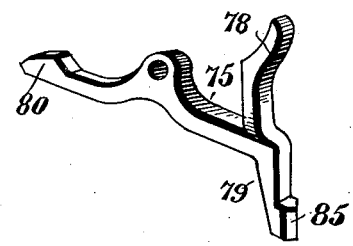
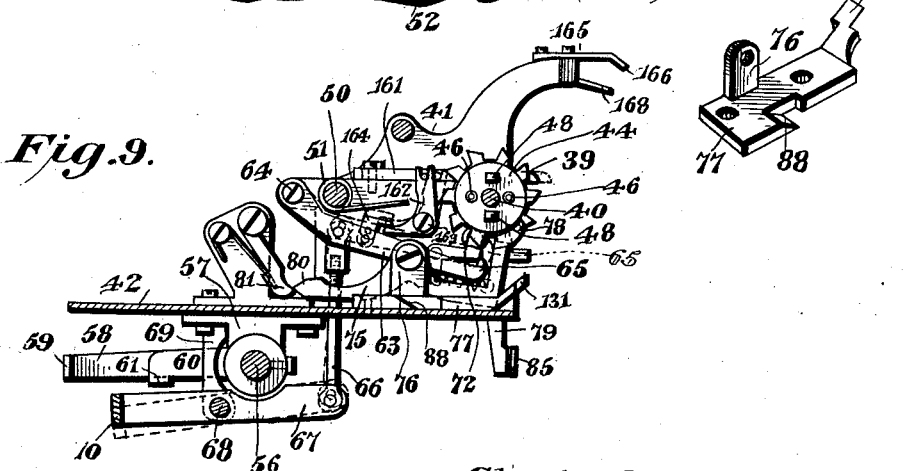

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.

15 SHEETS—SHEET 7.

Charles F. Laganke,
John A. Smith, Inventors

Witnesses
Jas. F. McCathran
Louis G. Julihn

Attorney

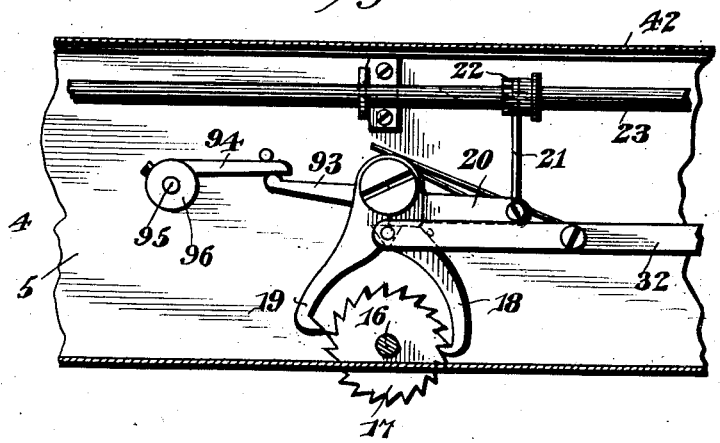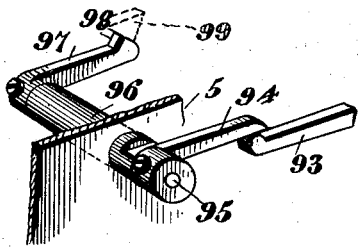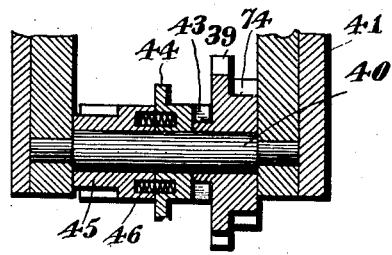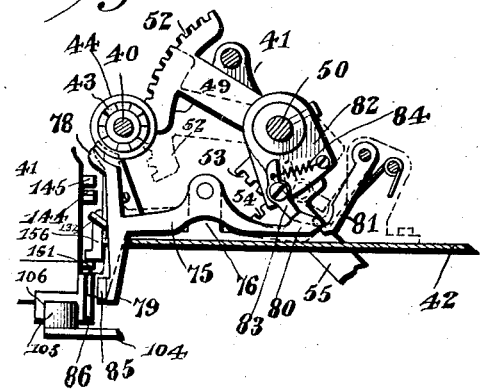

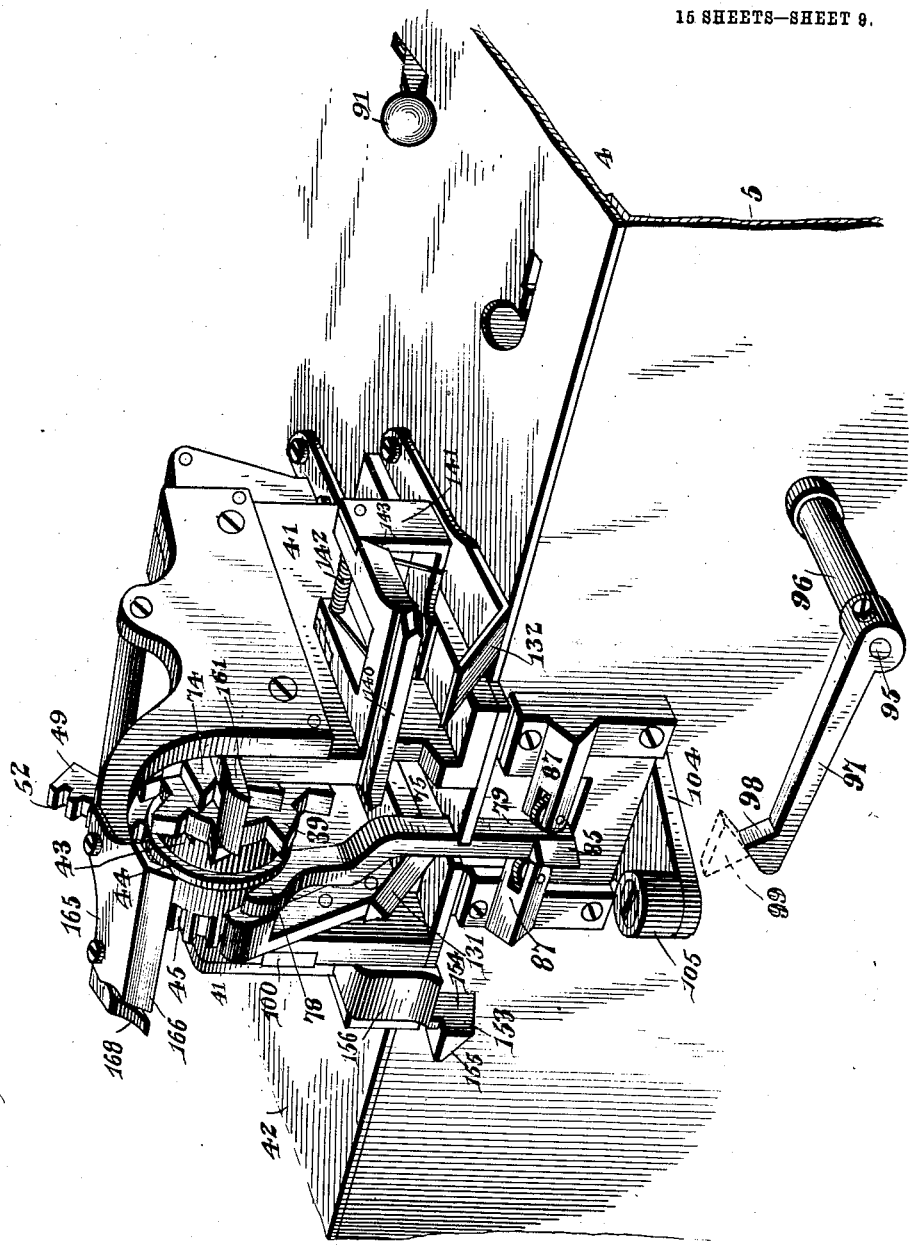

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.

15 SHEETS—SHEET 10.

Charles F. Laganke,
John A. Smith, Inventors

Witnesses

By

Attorney

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.
15 SHEETS—SHEET 11.
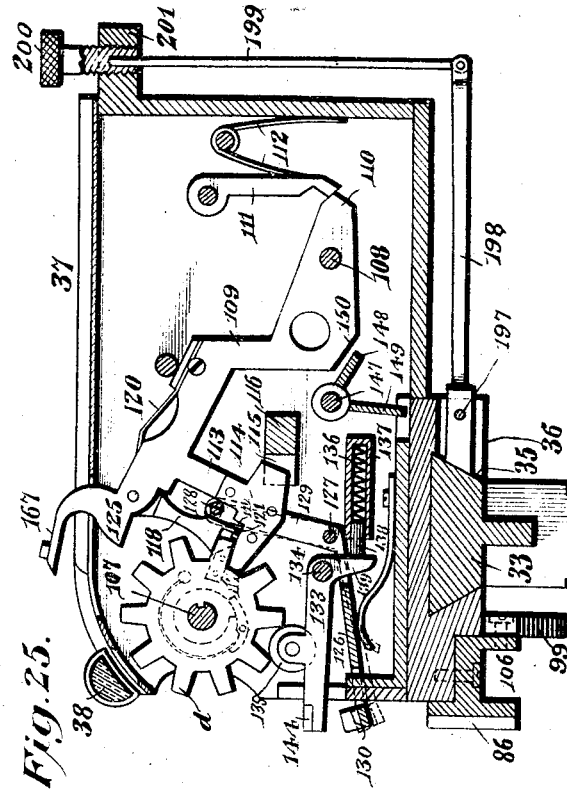
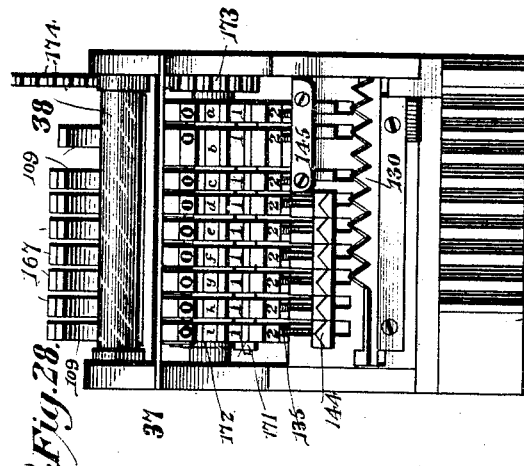
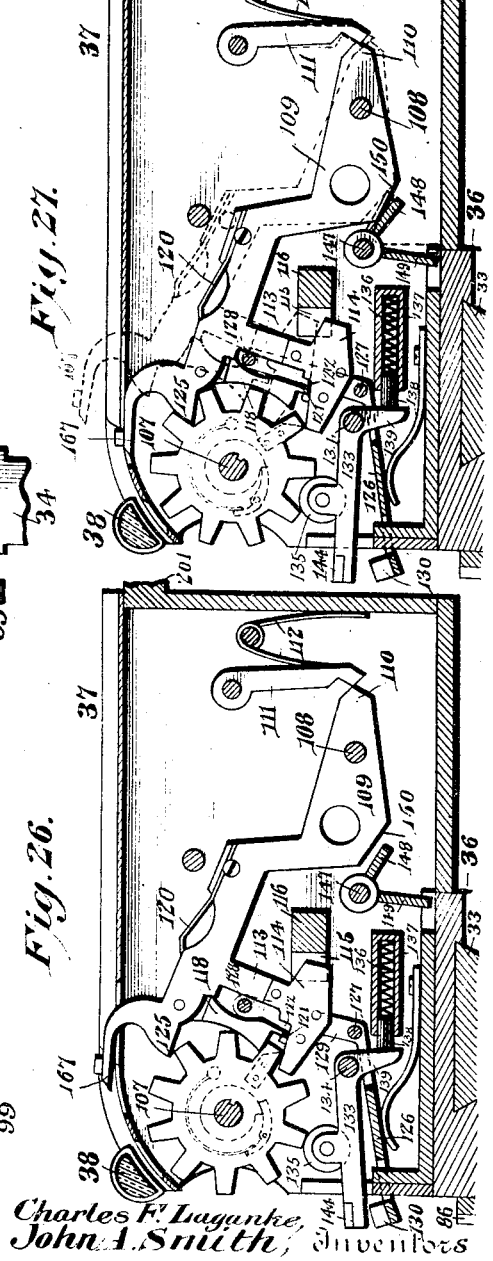
Charles F. Laganke,
John A. Smith, Inventors
Witnesses
Attorney

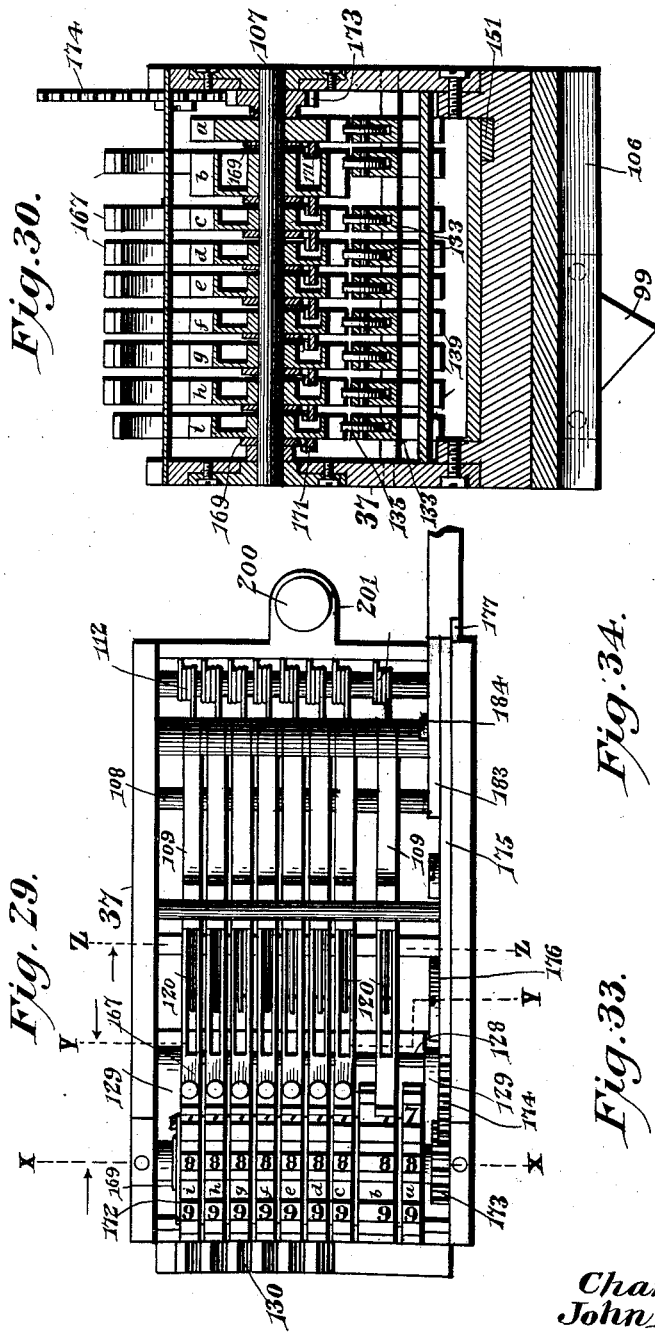

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.
15 SHEETS—SHEET 13.
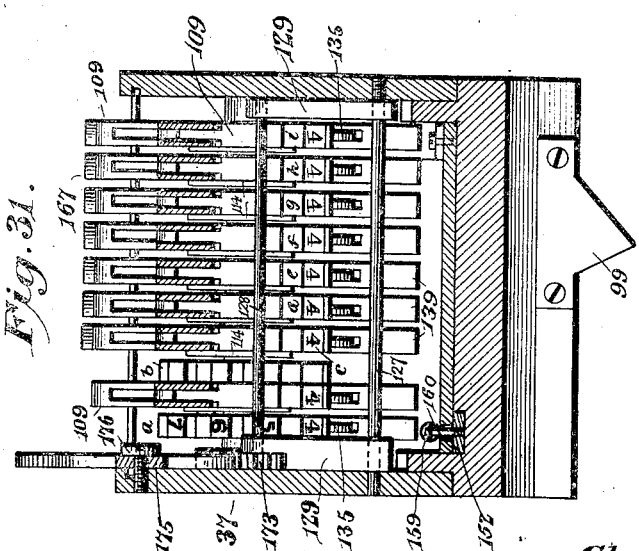
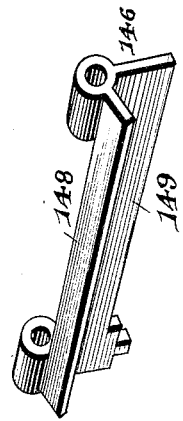
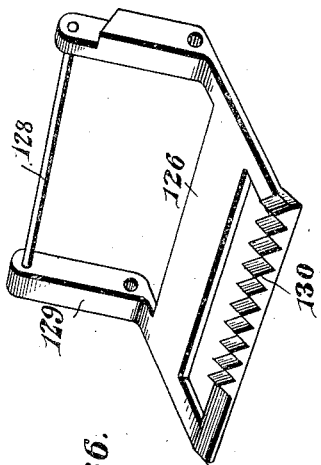
Charles F. Laganke,
John A. Smith, Inventors
Witnesses
Attorney

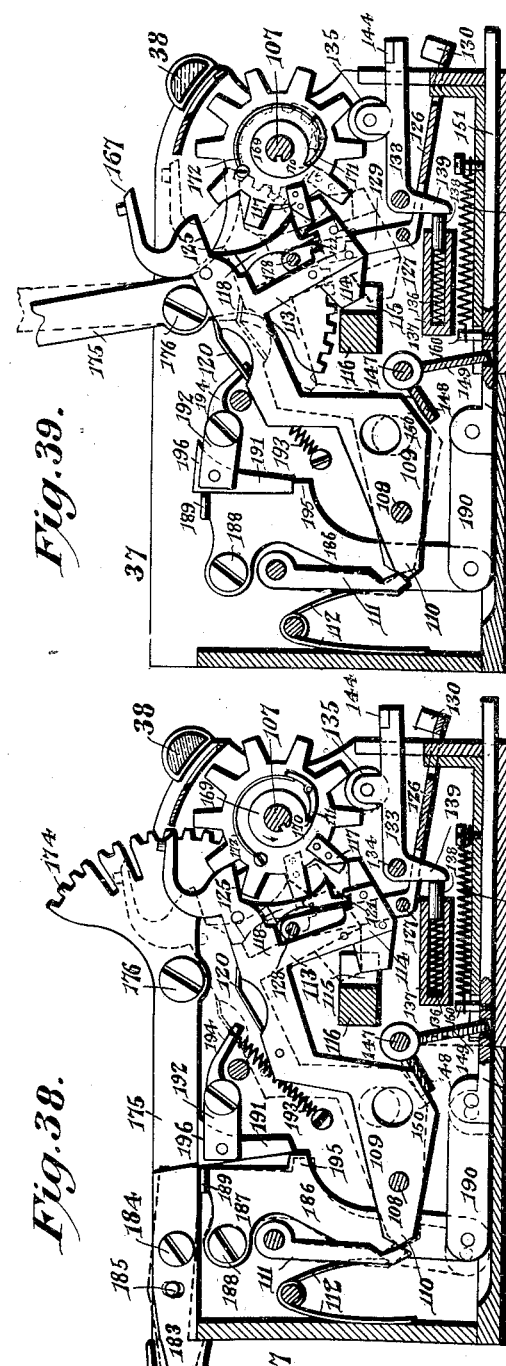

No. 820,879. PATENTED MAY 15, 1906.
C. F. LAGANKE & J. A. SMITH.
COMBINED CALCULATING AND TYPE WRITING MACHINE.
APPLICATION FILED SEPT. 17, 1903.
15 SHEETS—SHEET 15.
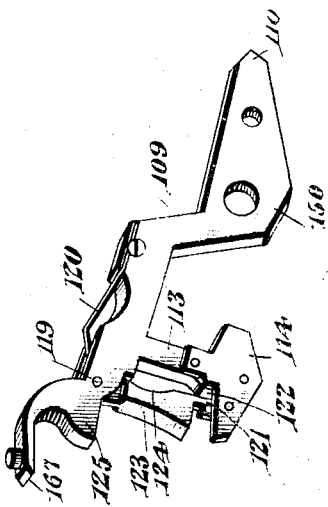
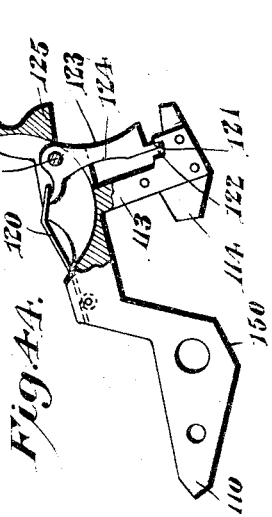
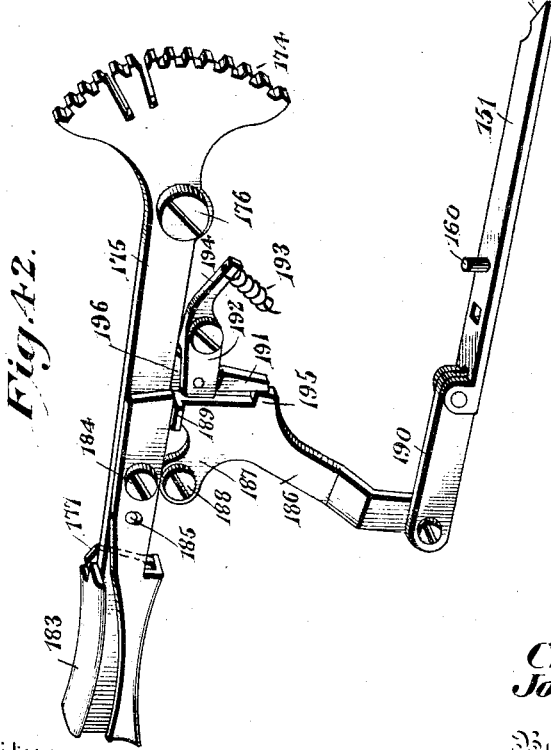
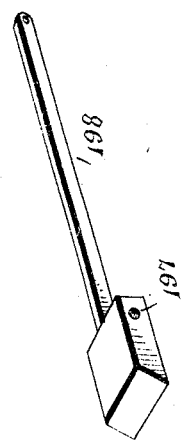
Charles F. Laganke,
John A. Smith, Inventors
Witnesses

UNITED STATES PATENT OFFICE.

CHARLES FREDERICK LAGANKE AND JOHN ASBURY SMITH, OF CLEVELAND, OHIO, ASSIGNORS TO ELLIOTT-FISHER COMPANY, OF NEW YORK, N. Y., A CORPORATION OF DELAWARE.

COMBINED CALCULATING AND TYPE-WRITING MACHINE.

No. 820,879.        Specification of Letters Patent.        Patented May 15, 1906.

Application filed September 17, 1903. Serial No. 173,614.

*To all whom it may concern:*

Be it known that we, CHARLES FREDERICK LAGANKE and JOHN ASBURY SMITH, citizens of the United States, residing at Cleveland, in the county of Cuyahoga and State of Ohio, have invented a new and useful Combined Calculating and Type-Writing Machine, of which the following is a specification.

This invention relates to a combined calculating and type-writing machine of that type disclosed in our copending application, Serial No. 120,925, for Letters Patent.

The primary object is to simplify and generally improve the former construction in order to facilitate its manufacture and repair and to minimize the possibility of error in the computations effected.

Subordinate to this primary object are various others, one of which is to facilitate the attachment of the computing device to the type-writing machine by mounting the master-wheel of the former and all of its operating connections upon the detachable cover of the carriage.

Another object is to simplify the means for preventing the retraction of the master-wheel operating connections when a key rises from an incomplete stroke, as well as the means for disconnecting the operating connections of the totalizer from the keys to permit the unrestricted independent use of the type-writer.

A further object is to provide decimal-spacing means for automatically spacing the machine over the decimal-point.

Still another object is to provide means for accurately locating the computing device with respect to the particular column concerned in the contemplated computation.

Still another object is to improve the construction of the computing device or totalizer by the provision of novel positively-operated and readily-accessible transfer mechanism and locating means which will insure proper movement of the denominational members or number-wheels and the accurate location thereof with the digits properly alined before the sight-glass.

Another object of the invention is to improve the touch by providing for the automatic easing of the wheels to minimize the burden imposed upon the key when a series of wheels are moved in unison.

A still further object of the invention is to improve the resetting mechanism for restoring the number-wheels to zero.

Other objects subordinate to those enumerated will appear as the necessity of their accomplishment is developed during the course of the succeeding description of the illustrated embodiment of the invention.

Figure 2:
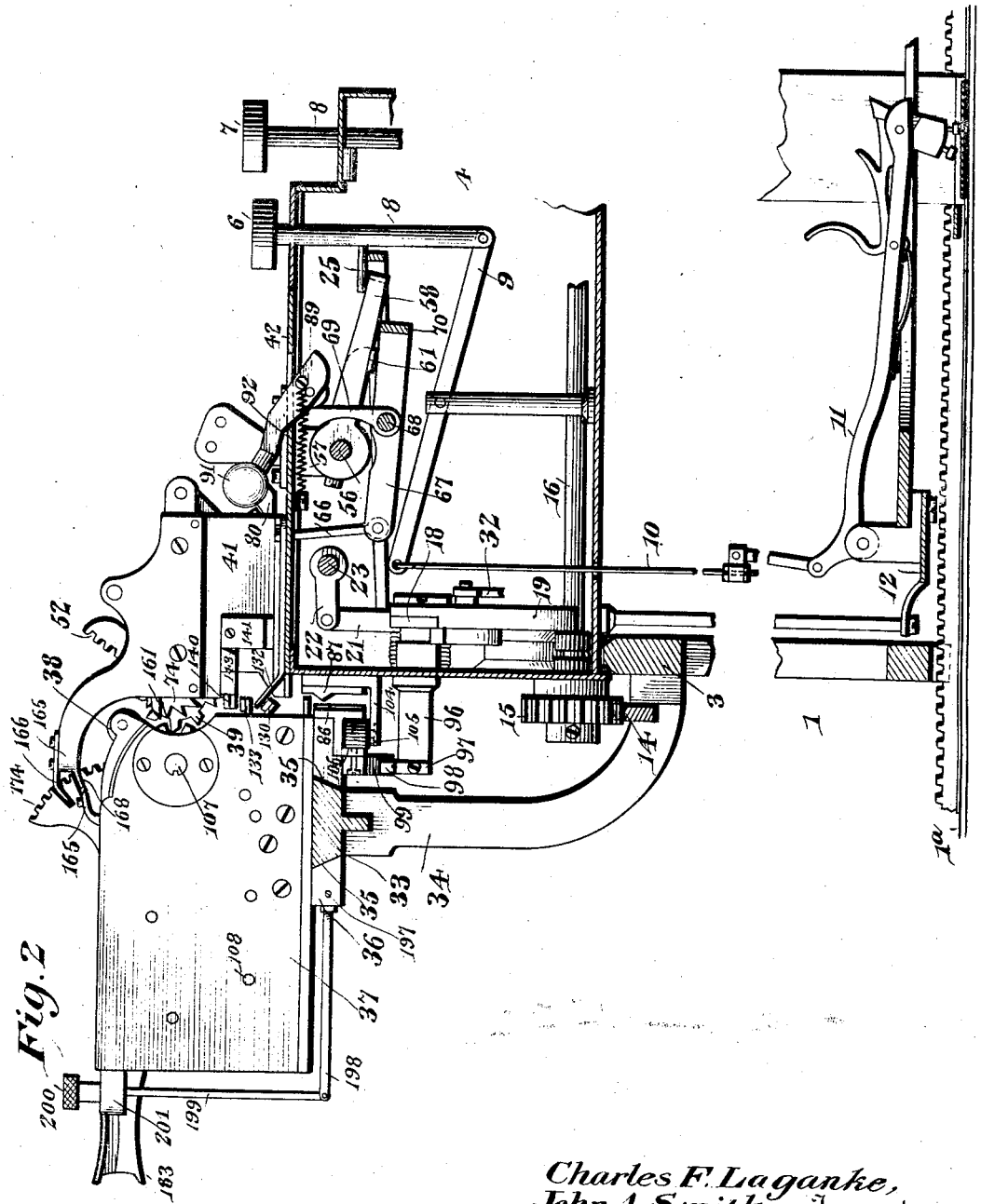
Figure 3:
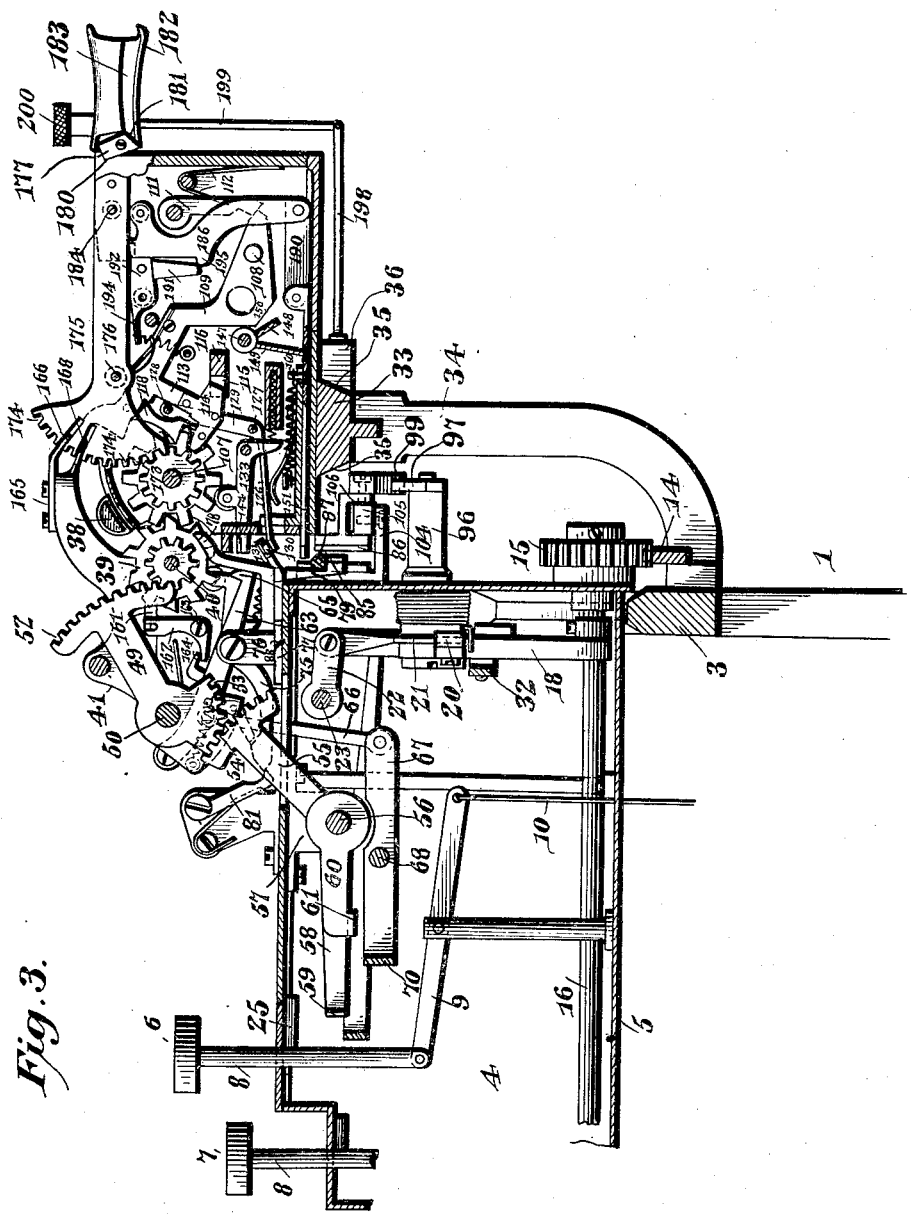
Figure 11:
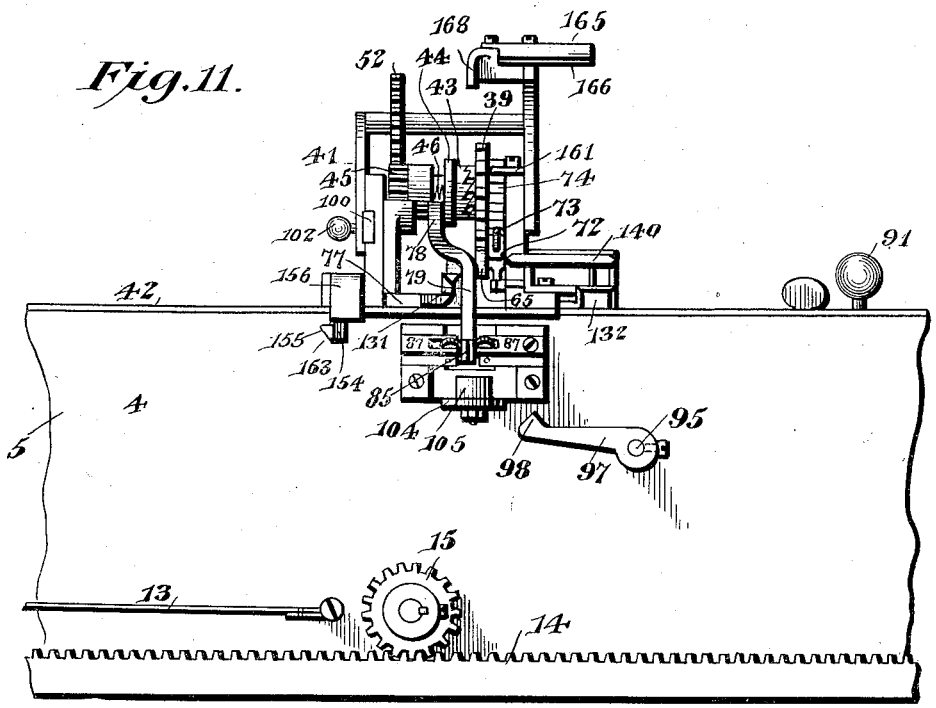
Figure 12:
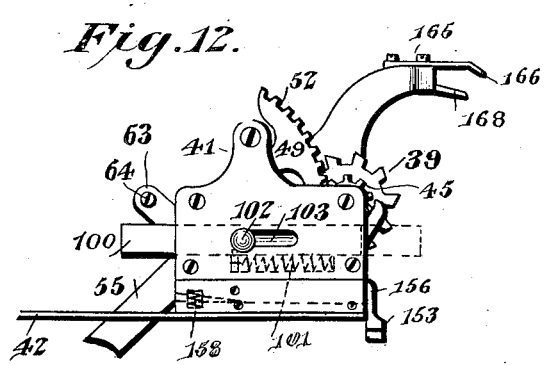
Figure 13:
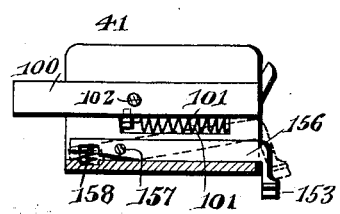
Figure 24:
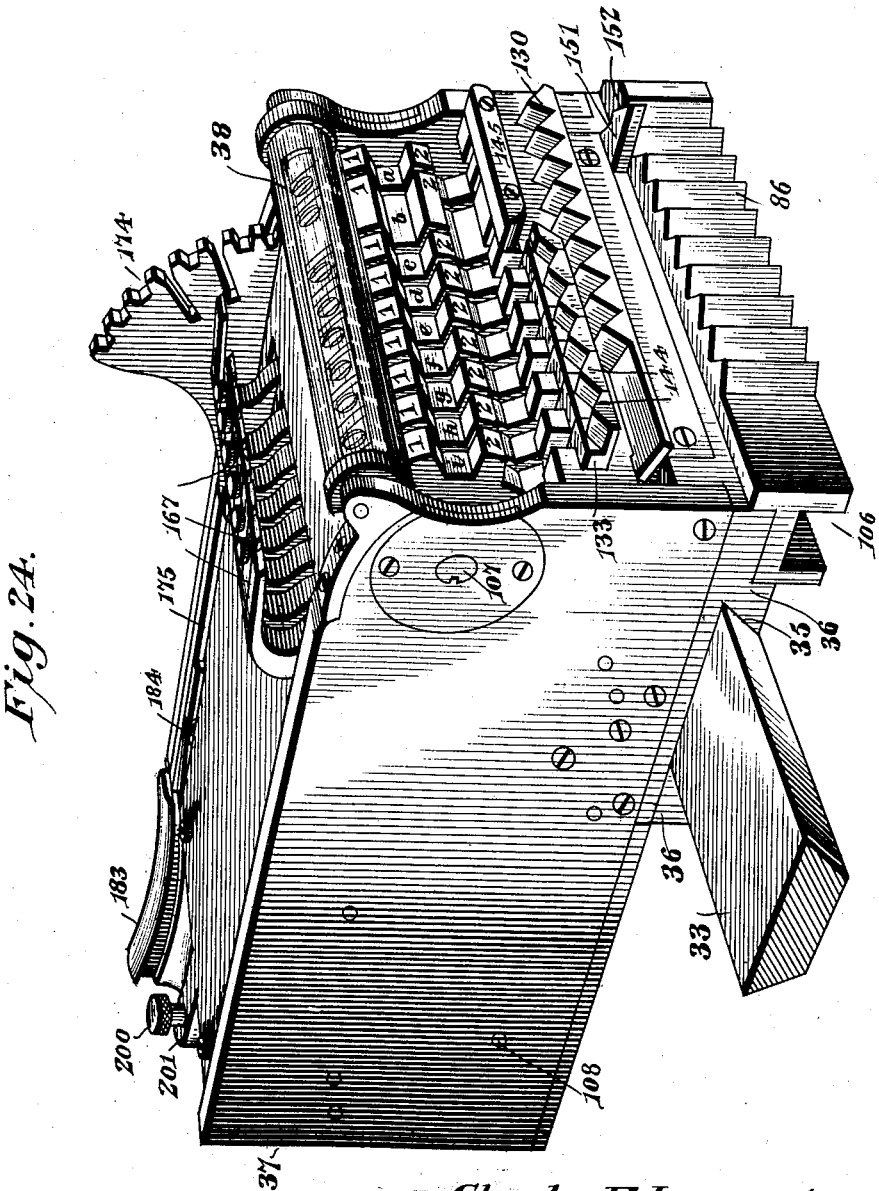

In the accompanying drawings, Figure 1 is a plan view of our combined type-writing and computing machine, a portion of the machine-frame being broken away. Fig. 2 is an enlarged sectional view on the line 2 2 of Fig. 1, certain of the parts being shown in elevation and others broken away, this view being designed to show the key-action and to illustrate the relation thereto of the operating connections of the computing device. Fig. 3 is another enlarged sectional view on the line 3 3 of Fig. 1, this view being similar to Fig. 2, but looking in the opposite direction, with the elements of a computing device and its actuating mechanism exposed to show the complete connection from the operating-keys to the digit carriers or number wheels. Fig. 4 is a plan view of the casing-top inverted to show such of the operating connections as are mounted thereon. Fig. 5 is a front elevation of the casing-top and the mechanism mounted thereon. Fig. 6 is a sectional elevation showing mechanism for preventing reverse rotation of the master-wheel and the checking-arm which prevents overrunning of the master-wheel. Fig. 7 is a sectional elevation of the cam-lever for breaking the operative connection between the keys and the computing device to permit the independent operation of the type-writing mechanism. Fig. 8 is an enlarged plan view of the casing top or cover and of the mechanism supported thereon. Fig. 9 is a sectional elevation showing the master-wheel and its operating connections and also showing the clutch-dog which prevents the retraction of the operating connections of the computing mechanism when a key rises from an incomplete stroke. Fig. 10 is a detail perspective view of said dog. Fig. 11 is a rear elevation of the carriage and the mechanism mounted thereon. Fig. 12 is a side elevation of the actuator-frame and certain of the parts associated therewith, the projected position of the stop for locating the computing device opposite a column of work being shown in dotted lines. Fig. 13 is a detail sectional elevation showing the mounting of the locating or column-selective stop. Fig. 14 is a sectional view through a portion of the carriage and the master-wheel operating connections with a portion of the computing device arranged in juxtaposition. Fig. 15 is a sectional view through the master-wheel and its mounting, the operating-pinion, and the intermediate clutch. Fig. 16 is a detail view of the combined operating-pinion and clutch member. Fig. 17 is a sectional view through the carriage-casing, showing in elevation the escapement of the carriage-feeding mechanism and the relation thereto of the decimal-spacing means. Fig. 18 is a detail perspective view of the decimal-space trip-arm and its connections. Fig. 19 is a detail view of the master-wheel check-arm. Fig. 20 is a detail sectional elevation showing the mounting of the arms on the rock-shaft. Fig. 21 is a detail perspective view of the shaft and arms. Fig. 22 is a detail perspective view of the plate 77. Fig. 23 is a perspective view, on an enlarged scale, showing a portion of the carriage-casing and the various parts mounted thereon and contributing to the utilization of the type-writer as a calculating-machine. Fig. 24 is an enlarged perspective view of the computing device designed particularly to show the various elements with which those mounted on the carriage-casing are designed to coöperate. Figs. 25, 26, and 27 are longitudinal sectional views through the computing device, but showing the transfer mechanism in progressively different positions. Fig. 28 is a front elevation of the computing device complete. Fig. 29 is a top plan view of the same with the top wall of the casing removed. Fig. 30 is a transverse sectional view on the line $x\ x$ of Fig. 29 with the top wall in place. Fig. 31 is a transverse section on the line $y\ y$ of Fig. 29, and Fig. 32 is a similar view on the line $z\ z$ of Fig. 29. Figs. 33 and 34 are detail perspective views of one of the denominational members, number-wheels, or digit-carriers. Fig. 35 is a similar view of one of the wheel-locaters. Fig. 36 is a detail perspective view of the vibrator which insures the engagement of the transfer-dogs with the wheels. Fig. 37 is a similar view of the rocker for elevating or retracting the transfer-levers. Figs. 38, 39, 40, 41 are longitudinal sections through the computing device, showing the resetting mechanism in progressive positions. Fig. 42 is a detail perspective view of the resetting-lever and the mechanism associated therewith for operating the rocker which retracts the transfer-levers. Fig. 43 is a detail perspective view of one of the transfer-levers. Fig. 44 is a side elevation of one of the levers, partly in section, to show the mounting of the transfer-dog. Fig. 45 is a detail perspective view of the computing-device-locking lever.

Like characters of reference are used to designate corresponding parts throughout the several views.

While the present invention may in certain aspects thereof be viewed as a calculating and computing machine solely, it is more particularly directed to the improvement of a combined type-writing and computing machine of the general character shown and described in our copending application, Serial No. 120,925.

The present computing device, like that shown in the application aforesaid, has been designed with special reference to the equipment of a type-writing machine of the flat-platen type exemplified, for instance, in Patent No. 573,868 to R. J. Fisher and characterized by a flat platen and a traveling carriage movable both longitudinally and transversely of the platen and carrying printing mechanism including both the letter and numeral types.

*The general organization of the Fisher type-writer.*—The Fisher type-writer, which is included in the illustrated organization of my combined type-writing and calculating machine, embodies a machine-frame 1, mounted to travel longitudinally of a flat platen $1^a$, the writing-surface of which is indicated in Fig. 2. The frame 1 is provided with front and rear carriage-guides 2 and 3, which slidably support a carriage 4, movable transversely of the platen and supporting the printing mechanism. The upper portion of the carriage 4 is in the form of a casing 5, above which are exposed the numeral and letter keys 6 and 7, having stems 8 connected at their lower ends to key-levers 9, fulcrumed within the carriage-casing and connected in turn through draw-wires 10 with downwardly-swinging type-bars 11, carried by a type-ring 12, pendent from the carriage-casing, as is well understood in the art. (See Fig. 2.) The carriage 4 is moved to the right by carriage-propelling mechanism, including carriage-tapes 13, connected at their inner ends to the carriage and at their outer ends to spring-drums (not shown) mounted on the machine-frame.

The step-by-step advance of the carriage in the direction of letter-spacing is controlled by carriage-feeding mechanism including in its organization racks 14, associated with the carriage-guides 2 and 3 and meshing with carriage-pinions 15, fixed to a feed-spindle 16, extending transversely of the carriage (see Fig. 2) and carrying the escapement-wheel 17, Fig. 17. This escapement-wheel is in the form of a ratchet and constitutes the rack element of an escapement, by the operation of which the step-by-step advance of the carriage under the impulse of the carriage-propelling mechanism is permitted. In addition to the escapement-wheel 17 the escapement of the carriage-feeding mechanism includes holding and spacing dogs 18 and 19, disposed for alternate engagement with the teeth of the wheel 17. Normally, as shown in Fig. 17, the holding-dog engages the ratchet-wheel and holds the same, thus preventing the forward movement of the carriage. When, however, the dogs are swung, the holding-dog moves out of engagement with the wheel; but before the disengagement is effected the spacing-dog moves into engagement. Such movement of the parts is effected by the depression of a key. When the key is released, however, the movement of the dogs is reversed, and while the spacing-dog is moving out of engagement with the wheel and before the holding-dog moves into engagement therewith the wheel is permitted to rotate an almost inappreciable distance, so that the holding-dog instead of moving back into engagement with the flat face of the tooth before engaged by it will engage the next succeeding tooth when the spacing-dog has moved back sufficiently to release the wheel, and thus permit the partial rotation thereof and the advance of the carriage the distance of one letter-space.

The operating mechanism between the keys and the escapement includes an arm 20, extending from the spacing-dog and connected by a link 21 to an arm 22, projecting from a rock-shaft 23, extending longitudinally of the carriage adjacent to its rear wall. (See Figs. 2, 3, and 17.) This rock-shaft is rocked or vibrated by key-yokes 24, mounted to swing within the casing and arranged to be engaged and swung by a pin 25 (one of which is carried by each key-stem) just as the key reaches the limit of its downward movement. It will thus be apparent that the complete depression of a key will effect the swinging of the yoke 24 to rock the shaft 23, and thus shift the escapement-dogs, the release of the key serving to permit the dogs to swing back for the purpose of effecting the feed of the carriage.

As the Fisher machine is arranged to print upon a work element supported in a flat spread-out condition upon the platen, it is particularly well adapted for tabulation, and it therefore embraces in its general organization what is commonly known as "tabulating" or "denominational" selective mechanism. This mechanism is designed to facilitate the rapid movement of the carriage from column to column and its accurate location opposite any column, with its printing-point opposite the denomination or order in which it is desired to make an entry.

This tabulating mechanism in the illustrated embodiment thereof (see Fig. 1) includes a straight scale-bar 26, secured to the front carriage-guide 2 and provided with the usual space-scale, over which the carriage indicator or pointer moves in a manner well understood. The scale-bar is provided with a longitudinal series of pin-openings 27, corresponding to the graduations on the scale and designed for the reception of space-pins 28, constituting column-stops varying in number according to the number of columns to be printed upon the sheet. The carriage is equipped with catches—to-wit, a variable catch 29 and a units-catch 30—which are designed to be projected into position to engage the column-stop to arrest the carriage in the desired position. These stops are ordinarily key-operated, the key 31 of the units-catch being so arranged that by its depression the catch will be thrown down into a path obstructed by the column-stop for the purpose of arresting the carriage with the printing-point thereof located in the units position with respect to one of the columns on the sheet. It will of course be understood that these catches are operatively connected to a release-lever 32, (see Fig. 17,) which serves when vibrated to swing both dogs of the escapement out of engagement with the wheel 17, so as to release the carriage, and thus permit its free advance until arrested by the tabulating mechanism.

Since the tabulating mechanism and its connections have only been indicated in a general way in the accompanying drawings, reference is made for a further detailed disclosure to Patents No. 666,762 to Charles F. Laganke and No. 723,937 to J. A. Smith.

*The general relation of the computing device to the type-writing machine.*—Having now recited the general organization of the type-writing machine with especial reference to those features thereof which are more or less intimately related to the present invention, it is next in order to explain the relation of the said machine to the computing device.

In rear of the machine-frame 1 a guide-bar 33 is supported in parallelism therewith by brackets 34, extended upwardly and rearwardly from the carriage-guide 3 to dispose the bar substantially in the horizontal plane of the top of the casing 5. The bar 33 is of dovetail cross-sectional contour and engages a correspondingly-formed guide-groove 35 in the base 36 of the casing 37 of the register, totalizer, or computing device.

The casing 37 contains the computing and registering mechanism, to be hereinafter described, and is adjustable along the bar 33 to dispose said mechanism opposite the column to be totalized. The computing and registering mechanism within the casing 37 is specifically novel and will be hereinafter described in detail. For the present, however, it is sufficient to direct attention to the fact that it includes, as is usual in this class of devices, a series of denominational members, digit-carriers, or number-wheels a, b, c, d, e, f, g, h, and i designed to register hundredths, tenths, units, tens, hundreds, thousands, tens thousands, hundred-thousands, and millions, the tenths-wheel being of double width to accommodate the decimal-space. Each of these wheels is provided upon its periphery with the digits "0" to "9," inclusive, preferably formed in or upon the end faces of the peripheral teeth, one digit of each wheel being observable through a magnifying sight-glass 38, extending across the casing 37 at its upper front corner. (See Fig. 24.) Each carrier or wheel is arranged to make nine-tenths of a complete revolution independently of the other wheels of the series to present its digits successively before the sight-glass and during its last increment of movement engages the wheel to the left and moves it a single increment or step, after which the first-named wheel may again rotate independently for nine-tenths of a complete rotation before again advancing the adjacent wheel at the left a single step. Since the wheels of the entire series are related to one another in the manner stated, it follows that mechanical computations in addition may be effected by moving the wheels corresponding in denomination or order to the denomination or order of the digits composing the numbers to be added a number of increments corresponding to the unitary values of such digits. Thus suppose it is desired to add "432" and "234." The ciphers of all of the wheels being disposed opposite the sight-glass, the wheel of the third order—to-wit, the hundreds-wheel e—will be rotated four increments, presenting the digit "4" opposite the sight-glass, the tens-wheel d of the second order will be rotated three increments, and the units-wheel c of the first order two increments or steps. The numerals observable through the glass will now read "432," corresponding to the first number. The second number 234 will now be added by imparting to the third-order wheel e two additional increments of movement, to the second-order wheel d three increments, and to the first-order wheel c four increments, thus causing the numerals presented before the sight-glass to read "666," the sum of the two numbers.

Since the numerical value of each order or denomination is ten and since each wheel during its last increment of movement will, as heretofore explained, impart a single increment of movement to the next adjacent wheel to the left, it follows that when the number registered reaches the limit of the numerical value of a given order the rotation of the adjacent wheel to the left will effect the registration of a digit of the next higher order. Thus, assuming the first order or units wheel c to be given nine increments of movement, causing the presentation of the digit "9" opposite the sight-glass, the next or tenth increment of movement will present the "0" on said wheel before the sight-opening, and by the automatic engagement of the wheel c with the wheel d of the next higher or second order the latter wheel will be moved a single increment to present the digit "1" of the second order before the glass, the presentation of the two digits "0" and "1" in the first and second orders effecting the registration of the number "10."

The mechanism contained in the casing 37 constitutes the computing device, which, as we have seen, is mounted independently of the carriage of the type-writing machine and is designed to be shifted to a position opposite any desired column on the work-sheet. The means for retaining the computing device at any desired point of the guide-bar 33 will be hereinafter described.

*The master-wheel and its operating connections.*—Upon the carriage 5 of the type-writing machine is mounted that portion of the computing mechanism which constitutes the actuating means for the computing device proper, which, as we have seen, is mounted independently of the carriage. The primary element of this actuating mechanism is a master-wheel 39, presentable to the number-wheels in succession by the step-by-step advance of the carriage and designed to rotate such wheels in proportion to the numerical value of the digits embraced by the computation. The contemplated means for rotating the master-wheel includes the numeral-keys of the type-writer, although it is obvious that viewing the invention as a calculating-machine it is immaterial whether the keys perform any function other than the actuation of the master-wheel. By reference more particularly to Figs. 3, 5, 6, 8, 9, and 15 it will be observed that the master-wheel 39 is rigidly mounted upon a short shaft 40, having its opposite ends supported by the vertical sides of what may be termed the "actuator-frame" 41, rigidly mounted in any suitable manner upon the removable top or cover 42 of the carriage-casing adjacent to the rear edge thereof. From one side of the master-wheel extends a toothed clutch-flange 43, Figs. 8, 11, and 15, formed with ratchet-teeth arranged to be engaged by what may be termed the "master-wheel clutch" 44, slidably and rotatably mounted on the shaft 40 and designed to effect an operative connection between the master-wheel 39 and an operating-pinion 45, rotatably mounted on the shaft 40. The master-wheel clutch is constantly urged toward its engaging position by springs 46, suitably interposed between the pinion and the clutch, and in order that the connection between the pinion and the clutch may be maintained regardless of the movement of the clutch into and out of engagement with the master-wheel the pinion is formed with an enlarged hub having openings 47 (see Fig. 16) for the reception of projections 48, extending from the clutch. (See Figs. 8 and 9.) It will now be apparent that when the pinion is rotated in one direction an engagement with the master-wheel will be effected by the clutch 44, while the reverse rotation of the pinion will be independent of the master-wheel, for the reason that the inclined faces of the teeth on the clutch will ride upon the inclined faces of the teeth formed on the flange 43, thus urging the clutch laterally against the resistance of the springs 46 and permitting the rotation of the clutch with the pinion and independent of the master-wheel. The operating connection between the numeral-keys and the pinion includes an actuating-lever 49, (see Fig. 3,) mounted on a short shaft 50 in the actuator-frame and provided with a retracting-spring 51, encircling the shaft and tending to move the lever to its retracted position. The lever 49 is fulcrumed adjacent to its front end and is formed at its opposite extremities with toothed segments 52 and 53, the former meshing with the pinion 45 and the latter with a toothed segment or rack 54, carried at the extremity of a rack-arm 55, projecting through the top of the carriage-casing from a rock-shaft 56, mounted in bearing-brackets 57, pendent from the removable top or cover 42 of the carriage-casing. (See Figs. 4 and 5.) This rock-shaft constitutes a motion-transmitting element mounted within the carriage-casing and common to all of the numeral-keys—that is to say, the numeral-keys are each designed to impart a different degree of movement to the rock-shaft 56 for the purpose of transmitting through the latter and its intermediate connections such movement to the master-wheel as will serve to advance a digit-carrier or number-wheel a number of increments corresponding to the unitary value of the key.

The operating connections between the keys and the rock-shaft comprehend a series of loose arms 58, extending laterally from the shaft and having angular ends 59 disposed for engagement by the key-stem pins or projections 25. (See Fig. 2.) Adjacent to each loose arm 58 the rock-shaft 56 is equipped with a comparatively short fixed arm 60, provided with a lateral extension 61, disposed under the adjacent loose arm so that when the latter is swung down by the depression of a key it will engage the fixed arm, and thus swing the latter and effect the partial rotation of the shaft 56. Normally all of the key-stem pins 25 are in engagement with the top of the carriage-casing, as shown in Fig. 3, thereby serving to limit the upward movement of the keys. Since the movements of all of the keys are uniform and since the key-stem pins are all normally disposed in the same horizontal plane, it is obvious that provision must be made for the differential movement of the shaft 56 in correspondence with the value of the several digits. The present embodiment of such provision comprehends the graduated arrangement of the arms 58 and 60, the short arms 60 being fixed upon the shaft in such positions that the loose arms 58 will normally lie in different horizontal planes. (See Fig. 5.) Thus the arm 58 at the extreme left-hand end of the series will be normally disposed at a sufficient distance below the stem-pin of the "1" key to permit independent movement of the key during eight-ninths of its stroke, after which the pin contacts with the angular end 59 of the arm 58 and swings it and the adjacent arm 60 to rock the shaft 56. This movement of the rock-shaft is sufficient to effect one increment of movement of the master-wheel and a similar movement of the digit-carrier in mesh therewith. The several arms 58 to the right of the one whose operation has just been described are located progressively in higher planes, so that the movement of said arms, and hence the movement of the rock-shaft and the operating connections between it and the master-wheel, will be increased in accordance with the increase in numerical value of the keys. Thus the arm 58 at the extreme right-hand end of the series will be normally in contact with the pin on the stem of the "9" key, so that during the entire stroke of the latter motion will be communicated to the master-wheel to effect nine increments of movement thereof. The retractile movement of the shaft 56 to its normal position is insured by the provision of a retracting-spring 62.

*The means for preventing overrunning of the master-wheel, or its reverse movement during the retraction of the operating connections.*—The rapid manipulation of the keys will obviously cause the rotation of the master-wheel at high speed, and when this movement is extended through a considerable arc— as, for instance, upon the depression of the "9" key—the impetus gained by the wheel tends to cause the overrunning thereof. To prevent this excessive movement, which would obviously render the computation inaccurate, I provide a checking-arm 63, (see Figs. 3, 6, and 9,) swung from a stud 64, screwed into one side of the actuator-frame. At its free end the arm 63 is provided with a beak 65, designed to be swung up into engagement with the master-wheel for the purpose of retaining the latter when its proper limit of movement is reached, the teeth of the wheel and beak of the arm being beveled, as shown, in order to facilitate the movement of the beak to its engaging position.

The checking-arm 63 is connected by a link 66 to one end of a rocker 67, fulcrumed upon a shaft 68, carried by bearing-brackets 69, pendent from the cover 42 of the carriage-casing. The shaft 68 also carries a swinging yoke 70, connected to the arm 67 and disposed to be engaged by the loose arms 58. (See Fig. 4.) When a key is depressed, it swings down one of the arms 58 to rotate the master-wheel through the intermediate connection, and just before the key reaches the limit of its stroke the arm 58 actuated thereby will engage and depress the yoke 70 to oscillate the rocker 67, and thus swing the checking-arm 63 into engagement with the master-wheel to check the same, and thus prevent its exaggerated movement.

The retraction of the checking mechanism when the key is released is effected or aided by a retracting-spring 71, encircling the shaft 68. (See Fig. 4.) The reverse movement of the master-wheel during the retraction of its operating connections is prevented (see Fig. 6) by a spring-urged dog 72, carrying a roller 73, engaging a ratchet-wheel 74, fixed to one side of the master-wheel. (See Figs. 6, 8, and 15.)

*The means for preventing the retraction of the master-wheel-operating connections when a key rises from an incomplete stroke.*—It sometimes happens, particularly in the rapid manipulation of the machine, that a key will be only partially depressed, the movement being sufficient, however, to rotate the master-wheel one or more increments. The operator will be apprised of the error by the failure of the carriage to feed forward; but it will appear that should the key be again struck and completely depressed the master-wheel will be moved a number of increments corresponding to the value of the key, and as the false stroke of the key has already moved the master-wheel one or more increments the computation will be erroneous to the extent of such false movement. In order to eliminate this possibility of error, we have provided means which will prevent the retraction of the operating connections when the key rises from an incomplete stroke, so that when the key is again depressed it will merely complete the proper movement of the master-wheel.

The present embodiment of such means includes (see Figs. 8, 9, 11, and 14) an angular locking-arm 75, pivotally mounted intermediate of its ends upon a bracket 76, upstanding from a plate 77, screwed or otherwise secured to the cover 42 of the carriage-casing between the sides of the actuator-frame. The locking-arm 75 is formed with a locking end 78 and a trip-arm 79, extending in opposite directions from its front extremity, and at its rear end is formed with a tailpiece 80, engaged by a spring-urged detent 81, which serves to yieldingly retain the arm 75 at either limit of its movement. Normally the locking-arm 75 assumes the position indicated in Fig. 14; but as soon as the actuating-lever 49 begins to move the locking-arm is designed to be thrown to the position indicated in dotted lines in Fig. 14, so as to present the locking end 78 thereof behind the master-wheel clutch 44 for the purpose of preventing said clutch from moving out of engagement with the master-wheel. Since the master-wheel is dogged against reverse movement and since the master-wheel clutch is held in engagement with the master-wheel by the locking-arm, it follows that the actuating-pinion 45, connected to the clutch, will be held against rotation, thus preventing the retraction of the actuating-lever 49 or any other element of the operating connection between the pinion and the key-stem.

In the present construction the means employed for swinging the locking-lever from its normal position to its locking position includes a plate 82, connected to the shaft 50 for movement with the actuating-lever 49 and carrying a diminutive contact-arm 83, pivoted upon the plate and held in its normal position by a spring 84. The end of this contact-arm 83 is normally in engagement with the tailpiece 80 of the locking-lever and serves to depress the tailpiece, and thereby swing the lever to its locking position as soon as the actuating-lever 49 begins its movement. The pivotal mounting of the contact-arm 83 permits the latter to move back to its normal position upon the retraction of the actuating-lever subsequent to the release of the locking-arm.

It has been premised that the present invention contemplates the retraction of the operating connections during the advance of the carriage—that is to say, during the movement of the master-wheel from one digit-carrier to the next. It is to attain this end that the arm 75 is provided with the trip-arm 79, which (see Figs. 10 and 14) is formed with a tooth 85, disposed to engage a series of fixed trips in the form of V-shaped teeth 86, projecting from the casing of the computing device at its lower front edge, Figs. 14 and 24. It will now be seen that the depression of a key will effect the rotation of the master-wheel and will throw the end of the locking-arm behind the actuator-cam, and thus prevent the retraction of the operating connections. If therefore the key is permitted to rise from a false or incomplete stroke, the operating connections will not be retracted, and as the carriage will not feed (since the feed-yoke will not have been operated to release the escapement) the operator will be apprised of the error and will again strike the key, this time effecting its full depression, completing the movement of the master-wheel and effecting the release of the escapement. As soon now as the key is released the carriage will feed forward one letter-space, this movement serving to cause one of the trips or teeth 68 on the register-casing to engage the trip-arm 79 of the locking-lever 75, thus swinging the lever from the dotted-line position in Fig. 14 to the full-line position in said figure, and thereby releasing the master-wheel clutch and permitting the retraction of the operating connections. When the carriage comes to rest, the tooth 85 of the trip-arm 79 will be opposite a space between two of the trips 86, so that when the master-wheel is again operated the movement of the lever 75 to its locking position will present the trip-arm in position to be engaged by another trip 86 during the next advance of the carriage. To prevent the derangement of the locking-arm by the engagement of the trip-arm 79 with the fixed trips 86, said trip-arm is preferably provided with an antifrictional guide 87, preferably constructed and arranged as shown in Fig. 23.

It is desirable to provide a positive stop for the actuating-lever 49 when a maximum movement of the latter is effected, and this stop (indicated by 88) is preferably formed on the plate 77, as shown in Fig. 22.

*The means for disconnecting the operating connections of the totalizer from the keys to permit the unrestricted independent use of the type-writer.*—In order to permit the unrestricted use of the type-writing machine independently of the computing device and without the keys thereof being burdened by the operating connections of the master-wheel, we have provided means for simultaneously disconnecting all of the elements of the computing-device connections from the keys when desired. A simple embodiment of such means comprehends a cam-lever 89, fulcrumed upon a bracket 90, secured to the casing-cover 42 and having a handle 91 extended through the cover for convenient manipulation by the operator of the machine. (See Figs. 2, 5, and 7.) This lever is arranged to be held in either of its extreme positions by a retaining-spring 92 and normally occupies the position shown in Fig. 2. By swinging the lever from the position shown in Fig. 2 to that shown in Fig. 7 one of the short arms 60 engaged thereby will be swung down sufficiently to remove all of the fixed arms on the rock-shaft from their operative positions. In order to reëstablish the operative connection between the master-wheel and the keys, it is simply necessary to restore the cam-lever 81 to its normal position, thus permitting the retraction of the rock-shaft 56 and the other elements of the connection to their operative positions.

*The automatic decimal-spacing means.*—In ordinary tabulating work, it is not customary to print the decimal, it being considered sufficient to provide a decimal-space between the digits in the units and tenths columns. In the construction of the computing device provision is made for this space by making the tenths-wheel *b* of double width; but to provide for the advance of the machine beyond the decimal-space it has heretofore been necessary to strike the space-bar. One of the features of the present invention is directed to the elimination of this additional movement by providing for the direct advance of the carriage from the units to the tenths order. This end is attained by providing means which will effect a double feed of the carriage upon the release of a key which has been depressed to print a numeral in the units order. In describing the general characteristics of the Fisher type-writing machine attention has been directed to the operation of the carriage-escapement, and it will be remembered that ordinarily the holding-dog 18 after having been moved out of engagement with the ratchet-wheel 17 by the depression of a key engages the next succeeding tooth of the wheel when the key is released. In order to effect the double feed which is necessary to advance the machine directly from the units to the tenths order, I provide means which when the holding-dog 18 is moved out of engagement with the wheel 17 retards the movement of the dog to its engaging position for that instant of time necessary to permit the ends of two teeth of the wheel to pass the nose of the dog before the latter again engages the wheel.

Connected to or formed as an integral part of the holding-dog 18 of the carriage-escapement is an arm 93, the end of which is disposed for engagement by an arm 94, extending laterally from a rock-shaft 95, provided with a cylindrical bearing-sleeve 96, piercing the back wall of the carriage-casing. (See Figs. 17 and 18.) At the extremity of the shaft 95 in rear of the carriage is fixed a trip-arm 97, having at its end a pointed beak or projection 98, which when the printing-point of the writing mechanism arrives opposite the decimal-space on the work-sheet will contact with a fixed trip 99 in the form of a pointed tooth depending from the under side of the computing-device casing 37. (See Figs. 2, 3, and 23.) Just as the projection of the trip-arm 97 engages the trip 99 the holding-dog 18 of the escapement will be in position to engage the tooth of the wheel 17 succeeding the one from which it has been disengaged by the depression of a key; but as the trip-arm is slightly depressed in passing under the trip the shaft 95 will be rocked to cause the arm 94 thereon to slightly depress the arm 93, thus keeping the nose of the holding-dog 18 out of engagement with the wheel until the points of two teeth instead of one shall have passed. This retardation of the holding-dog is only momentary, however, so that as soon as the automatic decimal-spacing has been insured the projection 98 will move past the trip 99, thus permitting the holding-dog 18 to complete its movement, and thereby arrest the machine with its printing-point opposite the tenths order of the column.

*The locating-stop for the computing device.*—In connection with this feature also of the invention reference to the general organization of the Fisher type-writer machine is necessary. It will be remembered that what is known as the "tabulating mechanism," comprising column-stops on the machine-frame and catches on the carriage, is employed for the purpose of accurately locating the printing-point of the writing mechanism with respect to the particular column in which it is desired to make an entry. Obviously it is just as necessary to properly locate the computing device with respect to the master-wheel as it is to locate the carriage with reference to the column. I therefore provide what may be termed a "computing-device stop or catch" 100, preferably in the form of a metal bar mounted to slide in suitable guides formed in one side of the actuator-frame. (See Figs. 1, 12, 13, and 23.) This slide is normally held in its retracted position, as shown, by a retracting-spring 101, but is designed to be projected to the dotted position indicated in Fig. 12 by the manipulation of the knob 102, secured to the stop and projecting through a slot 103 in the frame. The column stops or pins 28, having been adjusted on the bar 26 in accordance with the desired location of the columns, the units-catch 31 is depressed to release the carriage and present the units-catch in the path obstructed by the column-stop. The carriage then moves freely until arrested by the engagement of the catch with the stop, which will accurately locate the printing-point of the carriage at the units order of the column. Having thus located the carriage by the manipulation of the tabulating mechanism, the computing-device-locating stop 100 is projected to the dotted position indicated in Fig. 12, and the computing device is then moved along the guide-bar 33 until the side wall of the casing 37 contacts with the stop, which latter is so related to the master-wheel that when the computing device is arrested by the stop the number-wheel or digit-carrier of the units order will be accurately located opposite the master-wheel in correspondence with the location of the printing-point of the writing mechanism opposite the units order of the column on the work-sheet.

Obviously the tabulator and computing-stops could be arranged to present the printing-point at any desired order in the column and the master-wheel opposite any one of the several digit-carriers, the only essential relation of these parts being such as will cause the master-wheel to be located opposite a digit-carrier corresponding in order to the order of the printing-point when the carriage and computing device have been arrested by the tabulating and locating stops, respectively.

*The brace for connecting the carriage and computing device.*—To insure the proper relation between the carriage and computing device when the master-wheel moves into mesh with the digit-carriers, a brace 104 is extended rearwardly from the carriage and at its end is provided with an antifriction-roller 105, arranged for reception within the groove or channel 106 in the under side of the computing-device casing. (See Fig. 24.) As the movement of the carriage causes the digit-carriers of the computing device to be approached by the master-wheel, the roller 105 on the brace enters the channel 106 and effects a connection between the computing device and carriage, which will insure the certain movement of the master-wheel into engagement with the digit-carriers or number-wheels.

We have now described the general organization of the machine, including the relation of the computing device and its actuator or master-wheel, the operating connections between the master-wheels and keys, and such of the mechanisms mounted on the carriage as may be properly understood without reference to the specific construction of the computing mechanism. It may be pointed out, however, that in addition to the structure already described the carriage supports a number of devices the utility of which cannot be appreciated without a thorough understanding of the computing mechanism. We will therefore proceed at this point with a description of the computing device or totalizer and will incidentally describe in detail such of the coöperating devices as have been omitted from the preceding description for the reason stated.

*The computing device or totalizer.*—Within the casing 37, adjacent to its front end, is suitably journaled a transverse shaft 107, upon which the digit-carriers or number-wheels $a$ to $i$ are mounted for independent rotation, the shaft being normally held stationary. The digit-carriers are toothed, as shown, and upon the ends of the teeth of each carrier are printed or cut the digits "0" to "9," inclusive, one digit of each wheel being observable through the magnifying sight-glass 38. Associated with these digit-carriers is suitable transfer mechanism, which when any carrier has completed nine increments of movement, or nine-tenths of a complete rotation, will transmit during the next or final increment a single corresponding increment of movement to the next adjacent carrier or wheel of higher order. In addition to the wheels and transfer mechanism the register-casing also incloses locating mechanism for the wheels and wheel-resetting mechanism, the former serving to insure the proper location of the wheels to aline the digits before the sight-glass and the latter being arranged to reset or return the number-wheels to zero for a repetition of the operation after a given computation has been completed. In addition to these mechanisms the computing device as a whole includes means operated from the carriage for disengaging the locating mechanism from the wheel, for insuring the engagement of certain elements of the transfer mechanism, and for unlocking the wheels and restoring the transfer mechanism to its normal position after the wheels have been reset. The specific construction and special utility of these various mechanisms and devices will be detailed under appropriate headings.

*1. The transfer or carrying mechanism.—* Adjacent to the rear end of the casing 37 is disposed a transverse supporting-rod 108, upon which are independently mounted a series of transfer members or levers 109, one of these levers being arranged opposite each of the number-wheels with the exception of wheel *a*, for which no lever is provided. These levers are arranged to swing from the rod 108 in a manner to be described, and each is formed with a pointed tailpiece 110, engaged by a swinging detent 111, urged to its engaging position by a spring 112 and arranged to yieldingly retain the lever at either limit of its movement. The levers 109 are of irregular form, and each is provided in rear of its front end with a pendent arm 113, to which is attached in a laterally-offset position (see Figs. 43 and 44) a contact-plate 114, having its front end extended between a pair of digit-carriers and its rear end located in one of a series of guide openings or notches 115 in a guide-bar 116, extending across the casing. (See Fig. 25.) The front end of each contact-plate 114 is arranged to be engaged by a lug or projection 117, preferably having the form of a small plate secured to the left-hand side face of each digit-carrier except the carrier *i*. (See Figs. 25 and 34.) This engagement of the projection 117 with the contact-plate 114 does not occur, however, until the digit-carrier has moved nine increments, the purpose of the engagement being to cause the carrier or wheel when moved the final or tenth increment to swing down a transfer-lever for the purpose of effecting a single increment of movement of the adjacent wheel to the left. The connection between each transfer-lever and the wheel served by it is established through the medium of what may be termed a "transfer-dog" 118, (see Figs. 25, 43, and 44,) pendent from the transfer-lever in advance of the arm 113 and having a flat lower end designed to extend over and engage one of the teeth of the adjacent number-wheel. The dog is pivotally mounted at its upper end in the transfer-lever, as indicated at 119, and is yieldingly urged toward its engaging position by a spring 120, the swinging movement of the dog relative to the lever being limited by a stop 121, extending from the lower end of the dog and engaging a recess 122 in the arm 113. (See particularly Fig. 44.) The front face 123 of the dog is concaved from end to end thereof, and its rear face is formed with a concavity 124 for a reason which will be made apparent.

Assuming that the number-wheel shown in Fig. 25 is wheel *d* and that the projection 117, shown in said figure in dotted lines, is carried by the wheel *c*, it will be observed that the wheel *c* has been rotated nine increments—to wit, from "0" to "9"—by the master-wheel. As the wheel *c* completes its ninth increment of movement the projection 117, carried thereby, is brought into engagement with the contact-plate 114 of the transfer-lever 109, which serves or communicates movement to the next higher wheel *d*, the parts being positioned as shown in Fig. 25 and the wheels *c* and *d* registering "9" and "0," respectively, before the sight-glass. Another or tenth increment of movement imparted to the wheel *c* will cause the transfer-lever to be thrown down. As the transfer-dog 118 is in engagement with the upper side of one of the teeth of the wheel *d*, this downward movement of the lever will be communicated to said wheel, the rotation of which will bring the tooth next in rear of the one engaged by the dog into contact with the front face of said dog and will move the latter out of engagement with the wheel. Before this disengagement is effected, however, the front end 125 of the transfer-lever 109 will engage the upper corner of a tooth of the wheel *d*, (see Fig. 26,) so that notwithstanding the disengagement of the transfer-dog 118 the operative connection between the wheel *d* and the transfer-lever will be maintained, thus insuring the transfer of a complete increment of movement to said wheel. At the completion of this movement of the wheels *c* and *d* in unison the side face of one of the teeth of the wheel *d* will be brought into engagement with the end 125 of the transfer-lever, and the projection 117 of the wheel *c* will have moved out of engagement with the contact-plate of said lever. In this position of the parts (see Fig. 27) the wheel *d* will be locked by the transfer-lever, and the wheel *c* will be capable of continued movement independently of the wheel *d*.

It will be observed that when the transfer-lever moves down the point of its tailpiece will swing relative to the point of the detent 111, and by reference to Fig. 26 it will be seen that the point of the tailpiece passes the point of the detent just as the front end of the transfer-lever is brought into engagement with a tooth of the wheel *d*. As the detent will now engage the under side of the point of the tailpiece 110, the spring 112 will exert some force tending to swing the front end of the lever downward, this arrangement serving to insure a complete movement of the lever and the wheel $d$ in the event of slight premature disengagement of the projection 117 and the contact-plate 114.

*2. The means for positively moving the dogs into engagement with the number-wheels.*—While the springs 120 are ordinarily effective to move the transfer-dogs 118 into engagement with the number-wheels, such engagement is absolutely insured by the provision of a vibrator 126. (See Figs. 25 and 36.) This vibrator is in the form of an angular frame fulcrumed upon a supporting-bar 127, disposed transversely of the casing and having at its upper end a bar 128, extending between side arms 129 of the frame and disposed when the vibrator is rocked to the position indicated in dotted lines in Fig. 25 to engage all the dogs and move them positively into engagement with the number-wheels. The front end of the vibrator 126 is extended beyond the front of the casing 37 and is provided with a series of pointed projections or teeth 130. These teeth are so related that as the carriage moves for the purpose of advancing the actuator or master-wheel to each succeeding wheel a vibrator-actuator 131, mounted on the carriage, will engage the teeth to rock the vibrator forward during each advance movement of the carriage. The actuator 131 (see Fig. 23) is preferably in the form of a small inclined bar of triangular cross-section preferably extended from the front end of the plate 77. By reason of its triangular form the inclined side faces of the bar or actuator will readily ride over the inclined faces of the teeth 130 of the vibrator. Also mounted on the carriage, but at some distance to the left of the actuator 131, is a vibrator-depressing plate 132, which engages the teeth of the vibrator and depresses the latter as the master-wheel is moving away from the digit-carrier of lowest order. This final movement of the vibrator insures the engagement of the dogs with the wheels, so that upon the return of the carriage the teeth of the master-wheel will register accurately with the spaces between the teeth of the digit-carriers, and thus be permitted to move back freely when the carriage is retracted to begin a new line of writing.

*3. The locating mechanism for the number-wheels.*—For the purpose of locating the number-wheels with accuracy so that the digits will always be disposed in exact alinement before the sight-glass and for the further purpose of preventing reverse rotation of the wheels by frictional contact with the transfer-dogs during the elevation of the transfer-levers we provide what may be termed "wheel-locators" 133. These locators are in the form of swinging arms mounted upon a transverse rod 134. Each locator is provided with a roller 135, urged upwardly into engagement with the adjacent number-wheel by a spring 136, located in a spring-casing 137 and bearing against a plunger 138, which in turn bears against a depending angular extremity 139 of the locator. The roller 135 is of such diameter that when disposed opposite an interval between two teeth of the adjacent number-wheel its periphery will be engaged by the contiguous outer corners of the teeth. Obviously the rotation of the digit-carrier in either direction will necessarily be accompanied by the depression of the locator, and as this depression is resisted by the spring 136 it will be apparent that the number-wheel cannot be moved except by the application of sufficient force to overcome the spring. These locators therefore serve to hold the number-wheels in their accurately-alined positions. Aside from this retention of the wheels, however, these locators actually serve to locate the wheels. By reference to Fig. 26 it will be seen that when a wheel is rotated the adjacent locator is depressed to permit the teeth of the wheel to ride over the roller. As soon therefore as the tooth has passed beyond a plane intersecting the axis of both the wheel and the roller the tendency of the locator to move back to its elevated position will serve to complete the movement of the number-wheel, which, however, will be arrested and located by the engagement of the next succeeding tooth with the roller.

*4. The means for easing the number-wheels to decrease the burden imposed upon the key when a series of wheels are moved in unison.*—It will be observed that the locators present more or less resistance to the movement of the wheels in either direction, and it follows, therefore, that the resistance opposed by a number of locators would burden the key-action when a number of wheels are moved in unison—as, for instance, in adding one to nine thousand nine hundred and ninety-nine. For the purpose of minimizing this resistance we have provided means for automatically easing the wheels by slightly depressing the locators of the wheels to the left of the wheel in engagement with the actuator, except in the case of the two wheels immediately to the left of the one being actuated. The reason for the exception of these two wheels is that the actuated wheel tends to move the wheel next adjacent, and this second wheel in turn when carried one increment tends to move the third wheel. With these two wheels, therefore, the locators are left in engagement, while the remaining locators to the left are depressed for the purpose of removing the unnecessary load from the key. The means whereby the locators are depressed in succession and held in such position as the carriage travels to the right is preferably in the form of a locator-depressing plate 140, hingedly mounted upon a support 141, secured to the actuator-frame. This plate is urged upwardly to its horizontal position by a spring 142, where it is retained by shoulders 143, disposed to bear against the support 141. The front ends of the locators 132 are extended beyond the front of the casing 37, where they are provided with teeth 144—that is to say, the locators, with the exception of those provided for the three wheels of lowest order, are so extended, these three wheels being excepted for the reason that, as heretofore stated, it is impracticable to depress the locaters of the two wheels next adjacent to the one being actuated, and as the necessity for depressing any of the locators ceases when the master-wheel moves out of engagement with the wheel $a$ of lowest order no provision need be made for depressing the locators of the wheels $b$ and $c$.

As the carriage moves to the right the locator-depressing plate 140, the ends of which are beveled, as shown, rides over the toothed ends of the locators, beginning with the locator of the wheel $i$ when the master-wheel is in engagement with the wheel $f$, and successively depresses the locators sufficiently to ease the wheels for the purpose stated. The depression is not sufficient, however, to absolutely prevent the locators from performing their functions as such—that is to say, while the rollers 135 are drawn back slightly their retraction is not such as will permit the jarring of the number-wheels to effect their dislocation. The teeth of the number-wheels are, as a matter of fact, prevented from riding over the rollers, so that while the wheels are eased they are nevertheless retained in such positions as will insure their accurate location when the locators are released and permitted to rise.

As the master-wheel reaches the wheels of lowest order the tendency of the wheels to the left to work out of position is greatly diminished, and, in fact, when the master-wheel reaches the number-wheel or digit-carrier of lowest order the tendency is entirely eliminated, except as to the two number-wheels $b$ and $c$. When therefore the master-wheel moves into engagement with the number-wheel of lowest order, it is practicable to entirely depress such of the locators as are extended beyond the front of the casing in order to still further decrease the resistance opposed to the key when an extended series of number-wheels are moved in unison. We therefore mount upon the front of the casing a rigid trip-bar 145, having its under corners beveled, as shown, and so located that as the master-wheel advances from the wheel $b$ to the wheel $a$ the locator-depressing plate 140 will ride under the trip-bar, and thus be swung down or depressed sufficiently to entirely retract the locators associated with the wheels $d$ to $i$, inclusive. As a result of this arrangement the almost prohibitive resistance, which has heretofore been opposed to a key by an extended series of wheels is minimized, and the touch is made comparatively light.

We have now seen that during the traverse of the computing device by the master-wheel the number-wheels will be rotated and that such as are moved by the transfer mechanism will be locked by the transfer-levers held in their depressed positions, as shown in Fig. 27. We have also seen how the locators accurately locate the wheels, the manner in which these locators are partially and wholly depressed in succession to ease the wheels, and how the transfer-dogs are positively moved into engagement with the wheels by a vibrator operated from the carriage. These various mechanisms are brought into action during the traverse of the computing device from left to right, and while the locators and the vibrator will resume their normal positions when the master-wheel moves beyond the number-wheel of lowest order the transfer-levers will still remain in their depressed or locked positions, and it is obvious that some means must be provided for returning these levers to their normal positions before the master-wheel again traverses the computing device, as otherwise the number-wheels would remain locked.

5. *The means for automatically restoring the transfer-levers to their normal positions upon the retraction of the carriage.*—The present embodiment of this lever-retracting mechanism includes a rocker 146, (see Figs. 1 and 25,) mounted to swing from a transverse bar 147 and comprising a pair of angularly-related leaves or plates 148 and 149. The leaf 148 of the rocker is disposed opposite a cam-face 150, formed on each of the transfer-levers 109 at a point in advance of its axis. When the transfer-levers or any of them are drawn down to their depressed positions, their cam-faces 150 are moved close to or in contact with the leaf 148 of the rocker, so that when the latter is rocked to the position indicated in dotted lines in Fig. 27 the transfer-levers will be raised or retracted to their normal positions. It has been pointed out that the springs 112 exert some force to assist in the downward movement of the levers, and it will now appear that these springs similarly assist in the elevation of the levers as soon as the detents 111 are brought into engagement with the upper sides of the tailpieces 110 of the levers.

It is contemplated to effect the retraction of the transfer-levers automatically as the carriage is drawn back to begin a new line of writing. The rocker 146 is therefore connected to a slide 151, (see Figs. 38 to 42, inclusive,) which extends beyond the front of the casing (see Fig. 24) and has a beveled extremity 152 disposed for engagement by what may be termed a "rocker-slide actuator" 153. (See Figs. 12, 13, and 23.) This actuator is formed with an inclined side face 154 and an inclined bottom face 155 and is carried at the end of an angular arm 156, pivotally mounted at one side of the actuator-frame, as indicated at 157 in Fig. 13. For the purpose of retaining the actuator 153 in a depressed position a spring 158 is interposed between the rear end of the arm 156 and its mounting. Assuming the transfer-levers, the rocker, and the rocker-slide to be in the positions indicated in Figs. 24 and 27, the retraction of the carriage to the left will present the inclined side face 154 of the actuator 153 to the inclined end 152 of the slide 151. As the movement of the carriage continues the slide will be forced back, thus swinging the rocker 146 to the dotted-line position in Fig. 27 for the purpose of effecting the elevation or retraction of the transfer-lever. As soon as the actuator 153 has passed beyond the end of the slide the latter and the rocker will be restored to their normal positions by a retracting-spring 159, (see Fig. 39,) secured at one end to a fixed part and at its opposite end to a pin 160, projecting from the slide. When the carriage again advances to the right, the actuator 153 will not move the slide 151; but, on the contrary, its inclined bottom or under face 155 will contact with the slide, thus causing the actuator to ride over the latter. The vertical movement of the actuator necessary to permit its operation in the manner specified is accommodated by the swinging of the arm 156 against the resistance opposed thereto by the spring 158.

It has been stated heretofore that one reason for the provision of the locators 133 is to resist any tendency of the number-wheels to rotate in a reverse direction during the retraction of the transfer-levers, and it will now be apparent that this tendency is induced by reason of the fact that the transfer-dogs 118 during their elevation with the levers are urged into frictional contact with the ends of the teeth of the number-wheels by the springs 120.

6. *The means for preventing accidental movement of a number-wheel when the adjacent wheel of lower order is brought to rest in the "9" position.*—In order that the special utility of this mechanism for preventing an accidental transfer of movement from one wheel to another may be made clear, it is necessary to recall the arrangement of the transfer mechanism. It will be remembered that when a number-wheel is moved to the "9" position, which is that position in which "9" is exhibited opposite the sight-glass, the lug or projection 117 on the wheel is brought into contact with the contact-plate 114 of the transfer-lever, which serves the next adjacent wheel of higher order, so that continued movement of the first wheel will depress the transfer-lever to transfer the movement from one wheel to the next. This contacting relation of the projection 117 and the contact-plate 114 is essential, because any lost motion between these parts will be multiplied when the number-wheels are turned in unison, and the transfer of movement would be ineffective because the wheels of higher order would not be moved a complete increment. It happens, however, that when a wheel is moved at a high rate of speed through a considerable arc—as, for instance, from "0" to "9"—by the depression of the "9" key the projection 117 on said wheel will strike a sharp blow upon the contact-plate of a transfer-lever, and although the wheel comes to rest just as this violent contact occurs the blow will nevertheless be sufficient in some instances to cause the accidental advance of the next adjacent wheel to the left served by the transfer-lever with which the projection has been brought into violent contact. This accidental transfer movement is prevented by what may be termed a "check-slide" 161, (see Figs. 3, 6, 9, 11, and 23,) slidably mounted at the left-hand side of the actuator-frame and arranged to be automatically projected into engagement with the number-wheel to the left of the one being actuated just as the latter number-wheel completes its movement. When the check-slide is thus projected to the dotted position indicated in Fig. 9, it extends over a tooth of the number-wheel, and therefore prevents the accidental advance movement of the latter in case the transfer-lever which serves said wheel is struck a sharp blow by the projection 117 on the wheel being actuated to register "9" before the sight-glass. It should be particularly noted, however, that this check-slide is not projected until just before the actuated wheel completes its movement. It will therefore oppose no obstruction to any transfer movement imparted to the wheel of next higher order by the wheel being actuated.

The projection of the check-slide 161 at the proper time is preferably effected through the medium of a bell-crank lever 162, fulcrumed upon the actuator-frame, as indicated at 163, and having one end connected to the slide, as by a slot-and-pin connection, and its opposite end operatively connected with the check-arm 63. (See particularly Fig. 9.) The end of the bell-crank lever preferably rests against the arm and is overhung by a small hook 164, mounted on the arm to insure the retraction of the lever and slide when the arm drops back to its normal position upon the release of the key. The arm 63 and the connected slide 161 will thus be seen to constitute key-operated means mounted on the carriage for checking the master-wheel to prevent overrunning thereof and for checking a number-wheel to prevent its accidental movement when the wheel engaged by the actuator has moved to the "9" position. This tendency of the wheels to advance when the projection 117 is brought into contact with the plate 114 is not altogether limited to the wheel immediately adjacent to the one being actuated, although in the case of the remaining wheels to the right the tendency is not so great, because no transfer movement is of greater extent than one increment, and the result is that the contact with the parts is not as violent as in the case of the wheel being actuated, because the latter may perchance move at great speed for nine increments before it is arrested. However, the tendency exists to some extent, and we have therefore made provision which supplements the check-slide 161 to prevent the accidental advance of the remaining wheels to the right. This means is in the form of a lever-depressing arm 165, extending rearwardly from the actuator-frame and having an extended edge 166, (see Fig. 23,) which overhangs and is arranged to slightly depress a series of lever extensions 167, projecting through the top of the casing 37. (See Figs. 2, 24, and 25.) The depressing-arm engages the extensions of the several transfer-levers to the left of the wheel next adjacent to the one being actuated and depresses these levers very slightly, but sufficiently to withdraw the contact-plates from their normal positions, so that they will not be struck violently by the projections on such of the wheels as come to rest in the "9" position. The reason for making the engaging portion of the depressing-arm of considerable length is that if the wheels $c$, $d$, $e$, $f$, and $g$ are all registering "9" and the wheel $h$ is registering "8" the addition of one unit by the actuation of the units-wheel $c$ will cause the wheels $c$, $d$, $e$, $f$, and $g$ to move from "9" to "0" and the wheel $h$ from "8" to "9," thus bringing the projection 117 on the wheel $h$ into violent contact with the plate 114 on the transfer-lever serving the wheel $i$, the tendency being to accidentally carry the latter wheel.

In the example given it will be seen that the units-wheel $c$ is being actuated while the millions-wheel is the one which has a tendency to make a false forward movement. The contact edge of the depressing-lever is therefore sufficiently extended to depress all of the levers to the left of the one next adjacent to the actuated wheel.

7. *The means for preventing the accidental locking of the number-wheel being actuated.*—Associated with the depressing-arm 165 is a stop-finger 168, which rides under the extensions 167 of the transfer-levers and is arranged to prevent the accidental depression of the transfer-lever which serves the wheel being actuated and which is served or operated by the next adjacent wheel to the right. The rotation of the actuated wheel—that is to say, the one engaged by the master-wheel—tends by frictional contact with the adjacent transfer-dog to depress the adjacent transfer-lever. Ordinarily the detent 111 would prevent the lever from being accidentally carried down, and thus locking the wheel; but to absolutely preclude the possibilty of an accident of this character the stop-finger 168 is provided, and it constitutes, as will be apparent, positive means for preventing the accidental depression of the transfer-lever which serves the wheel being actuated.

The foregoing completes the description of the entire machine so far is as necessary to fully explain the manner in which a column may be printed and totalized. It remains, however, to explain the provision which is made for resetting the number-wheels of the computing device to zero preliminary to a new computation.

8. *The number-wheel-resetting mechanism. (Figs. 3, 29, 30, and 38 to 41, inclusive.)*—Fixed upon the shaft 107 and alternating with the number-wheels are a series of resetting-cams 169, each of which is formed with a shoulder 170, these shoulders being normally alined and occupying the position shown in Fig. 38. Mounted to travel upon each of these cams is a resetting-pawl 171, pivoted upon the adjacent number-wheel and having its beak urged toward the periphery of the cam by a spring 172. When the number-wheels are registering "0" before the sight-glass, the beaks of the pawls 171, carried thereby, will be in engagement with the shoulders of the cams, this position of the pawls being indicated in Fig. 38. As the number-wheels are advanced one or more increments the pawls move away from the shoulders 170 of the cams, and when a given computation has been completed the pawls on the several wheels will occupy various positions with relation to the resetting-cams. It is obvious therefore that if the shaft 107 is rotated in the direction of the arrow in the above-mentioned figure the shoulders of the cams will engage the pawls of the wheels, and when said shoulders have reached their normal positions after one complete rotation all of the wheels will be reset at zero.

For the purpose of imparting the necessary movement to the shaft the latter is provided adjacent to one end with a pinion 173, engaged by a toothed segment 174 upon the rear end of a resetting-lever 175, fulcrumed upon a bearing-screw 176, projecting inwardly from one side wall of the casing 37. The throw of this lever is just sufficient to effect one complete rotation of the shaft 107, and it therefore follows that by swinging the lever from the full-line position in Fig. 38 to the dotted-line position in Fig. 39 the number-wheels will be reset.

The resetting-lever is retained in its normal position by a latch 177 in the form of a small block pivoted upon the lever and engaging a notch 180 in the casing 37. The latch 177 is provided at its lower end (see Fig. 3) with a cam-face 181, engaged by a flange 182, extending from a latch-lever 183, pivotally mounted upon the resetting-lever, as indicated at 184, and limited in its independent movement by a stop-pin 185 engaging a slot in the latch-lever.

We have seen that the transfer-levers when in their depressed positions lock the number-wheels and that the wheels are unlocked automatically upon the retraction of the carriage. It sometimes happens, however, that it is desired to reset the number-wheels before the carriage has been retracted, and the resetting mechanism therefore includes means whereby such of the transfer-levers as are depressed will be elevated to unlock the number-wheels before the resetting-lever begins its movement. In the present embodiment of the invention this means includes a swinging arm 186, having an angular upper end 187 pivotally mounted upon a bearing-screw 188, projecting from a side wall of the casing 37. At its upper end the arm 186 is provided at a point in advance of its axis with a lug 189, disposed to be engaged by the inner or front end of the latch-lever 183, the lower end of the arm being connected, as by a link 190, with the inner or rear end of the rocker-slide 151. (See Fig. 42.) Assuming that the parts are now in the positions indicated in full lines in Fig. 38 and that it is desired to reset the computing device, the end of the resetting-lever is grasped. This action serves to swing the latch-lever from the full-line position in Fig. 38 to the dotted-line position therein indicated, thus causing the flange 182 on the latch-lever to swing the latch 177 out of engagement with the casing and depressing the front end of the latch-lever, which by reason of its engagement with the lug 189 on the arm 186 swings the latter for the purpose of retracting the rocker-slide 151 and operating the rocker 146, which in turn effects the elevation of the transfer-levers 109 to release the number-wheels. The parts will now be in the positions indicated in dotted lines in Fig. 38, and the resetting-lever and number-wheels having been released the lever may be swung up for the purpose of resetting the wheels. Of course as soon as the latch-lever is moved out of engagement with the arm 186 by the elevation of the resetting-lever 175 the spring 159 will restore the slide 151 and the arm 186 to their normal positions.

When the resetting-lever reaches the position indicated in full lines in Fig. 39, the resetting-cams will have moved around nine increments, the shoulders 170 of said cams being within one increment of their normal position. As the beaks of the several pawls 171 are in engagement with these shoulders, it follows that the wheels will all be registering "9" before the sight-glass, and the projections 117 on the wheels will therefore be in engagement with the contact-plates 114 of the transfer-levers. Therefore during the final movement of the resetting-lever before restoring the cams to their normal positions the wheels will all be moved from "9" to "0" and the transfer-levers will be carried down and the number-wheels locked, the final positions assumed by the parts being indicated by dotted lines in Fig. 39.

Before the computing device can be again operated it is necessary to unlock the number-wheels, and while this may be done by retracting the carriage in the manner already explained it is desired to have the computing device complete within itself, so that it may be reset and the parts restored to their normal positions without reference to the mechanism mounted on the carriage. The resetting mechanism therefore includes in addition to the means for unlocking the wheels preparatory to the resetting thereof other mechanism for unlocking the wheels after the latter have been reset. This latter mechanism includes a block 191, pivotally mounted at the rear end of a swinging support 192, constantly urged upwardly by a spring 193, connected at one end to a fixed part and at its opposite end to a tailpiece 194, extended from the support 192. The block 191 is normally retained by the resetting-lever in the position shown in Fig. 38; but when said lever is swung up the support 192 is swung by its spring 193 and the block 191 is moved into engagement with a projection 195 on the arm 186. When in this position, (see Fig. 40,) the upper end of the block 191 is disposed somewhat above the plane of the lug 189. If now the resetting-lever, having reset and locked the wheels, is swung back to the position indicated in full lines in Fig. 40, it will contact with the upper end of the block 191 and during its final movement to its normal position will force down the block, thus moving the arm 186, the slide 151, and the rocker 146 and the transfer-levers 109 to the positions shown in dotted lines in Fig. 40. Thus the retraction of the resetting-lever effects the unlocking of the number-wheels by restoring the transfer-levers to their normal positions. As the block moves down, however, with the resetting-lever to effect the described movements of the arm 186 and connected parts it will be swung slightly on its individual axis by reason of the fact that its upper face 196, with which the resetting-lever contacts, is slightly inclined, and this individual movement of the block and the swinging movement of the arm 186 will effect the disengagement of the block from the projection 195. (See Fig. 42.) By reason of this disengagement the arm 186, having performed its function, may swing back to its normal position, thus presenting the lug 189 to the inner end of the latch-lever 183 and restoring the slide and rocker to their normal positions preparatory to the inauguration of another computation.

*The means for locking the computing device in its adjusted positions.*—While the binding-screw employed in our former application for securing the computing device to the bar after the former had been properly adjusted is entirely efficient, its location under the casing 37 is slightly inconvenient, and we have devised a simple locking device designed to be employed in lieu of said screw and arranged for more convenient manipulation.

The base 36 of the casing 37 is formed at one side of the groove or channel 35 with a cut-out portion, within which is pivoted, as indicated at 197, a locking-lever 198, having its front short end beveled, as shown, to engage the adjacent inclined side face of the guide-bar 33. The rear end of the lever 198 is extended beyond the rear end of the casing 37, where it is pivotally connected to a vertically-disposed push-rod 199, having its upper end extended into a threaded-shank thumb-screw 200. This thumb-screw is disposed above the top of the casing 37 and is screwed into a bearing-ear 201, projecting from the casing. When the computing device has been properly located by the stops in the manner heretofore explained, the operator reaches over and by screwing down the thumb-screw 200 depresses the rear end of the locking-lever and urges the front beveled end thereof into engagement with the guide-bar 33 to lock the computing device securely in place.

In the appended claims the word "column" is intended to designate a row of numbers as distinguished from a row of digits of a particular denomination or order of a column.

It is thought that the foregoing will suffice for the purpose of imparting a clear understanding of the invention to those skilled in the art, and it will of course be understood that while the illustrated structure is considered at this time to be a preferable embodiment of the invention we reserve the right to effect such changes, modifications, and variations of the structural details as may fall within the scope of the protection prayed.

What we claim as new is—

1. The combination with a computing device; of a carriage, keys for operating the computing device, a detachable cover-plate for the carriage, and operating connections assembled on said plate and arranged to transmit movement from the keys to the computing device.

2. The combination with a computing device; of a traveling carriage, a detachable cover-plate therefor, operating-keys for the computing device, and operating connections including an actuator mounted above the plate and differential mechanism suspended from the plate and having operative relation with the keys.

3. The combination with a computing device including digit-carriers and operating-keys for effecting the differential movement of said carriers; of operating connections between the keys and the computing device, said connections including an actuator movable to engage successive digit-carriers, a rock-shaft operatively related thereto, and a series of arms extending from the rock-shaft and operatively related to the keys.

4. The combination with a computing device including denominational members, and operating-keys for effecting the differential movement of said members; of operating connections between the keys and the computing device, said connections including an actuator movable to engage the denominational members in succession, a rock-shaft operatively related thereto, a series of arms extending from the rock-shaft, and a projection associated with each of the keys to engage one of the arms and thereby rock the shaft when a key is depressed.

5. The combination with a computing device, including digit-carriers; of operating-keys for imparting differential movement to the carriers, and operating connections between the keys and carriers, said connections including a laterally-shiftable actuator, a shaft geared thereto and shiftable therewith, and arms extending from the shaft in graduated arrangement and disposed for actuation by the keys.

6. The combination with a computing device and operating-keys having key-stems provided with projections; of operating connections including a laterally-shiftable actuator arranged to actuate the computing device, a rock-shaft geared to the actuator and shiftable therewith, and differential mechanism carried by the rock-shaft and arranged to be engaged by the projections on the key-stems.

7. The combination with a computing device and operating-keys therefor; of operating connections between the keys and the computing device, said connections including an actuator, a rock-shaft geared thereto, a series of fixed arms extending from the rock-shaft, a corresponding series of loose arms extending from the shaft and arranged to engage the fixed arms, said loose arms being operatively related to the keys.

8. The combination with a computing device and operating-keys therefor; of operating connections between the keys and the computing device, said connections including an actuator, a rock-shaft geared thereto, a series of fixed arms extending from the rock-shaft, a corresponding series of loose arms extending from the shaft and arranged to engage the fixed arms, and projections associated with the keys and disposed to engage the loose arms.

9. The combination with a computing device; of operating-keys therefor, operating connections between the keys and said device, said connections including a laterally-shiftable actuator, an actuating-lever geared thereto, a swinging arm for operating the lever, and means whereby the keys effect a differential movement of the arm.

10. The combination with a computing device, operating-keys, and projections associated with the latter; of operating connections between the keys and the computing device, said connections including an actuator, an actuating-lever geared thereto, a rock-shaft, an arm extending from the rock-shaft to actuate the lever, and a graduated series of arms extended from the rock-shaft to be engaged by the projections associated with the keys.

11. The combination with a computing device; of a traveling carriage having a removable cover-plate, operating-keys for the computing device, and operating connections between the keys and said device, said connections including an actuator, a rocking member suspended from the removable cover of the carriage and geared to the actuator, and means for imparting differential movement to said member from the keys.

12. The combination with a computing device; of a master-wheel therefor, operating-keys, a connection between the keys and master-wheel including a series of graduated swinging arms, a check-arm arranged to engage the master-wheel to prevent overrunning thereof, and means operated by the graduated arms for moving the check-arm to its engaging position to prevent overrunning of the master-wheel.

13. The combination with a computing device; of a master-wheel therefor, operating-keys, a connection between the keys and master-wheel including a series of graduated swinging arms, a check-arm arranged to engage the master-wheel to prevent overrunning thereof, a universal member disposed for engagement by each of the graduated arms, and an operative connection between the universal member and the check-arm.

14. The combination with a computing device; of operating-keys, a master-wheel, a connection between the master-wheel and the keys including a rock-shaft, a series of graduated arms extending therefrom, a yoke extending below the arms to be engaged thereby, and a swinging check-arm operated by the yoke to engage the master-wheel to prevent overrunning thereof.

15. The combination with a computing device including a series of denominational members; of a master-wheel arranged to engage said members, means for operating the master-wheel, a check-arm to prevent overrunning of the wheel, and means for operating the check-arm, the engaging portion of said arm and the teeth of the master-wheel being beveled to facilitate the movement of the arm to its engaging position.

16. The combination with a computing device, a key capable of making either a complete or incomplete stroke, and an intermediate operating connection, of means for locking the connection against retraction when the key rises from an incomplete stroke, and means, automatically brought into action after a complete key-stroke, to unlock the connection.

17. The combination with a computing device, a key capable of making either a complete or incomplete stroke, and an intermediate operating connection, of a member for locking said connection against retraction as the key rises from an incomplete stroke, and power mechanism separate from the key for moving the member to unlock the connection.

18. The combination with a computing device, a key, and an intermediate operating connection, said key being capable of making either a complete or incomplete stroke; of means preventing the retraction of said connection as the key rises from an incomplete stroke, and means, operative subsequent to the completion of a full key-stroke, for releasing said connections to permit the retraction thereof.

19. The combination with a computing device, a key and an intermediate operating connection, said key being capable of making either a complete or an incomplete stroke, of means for locking the connection against retraction when the key rises from an incomplete stroke, a power-operated member for unlocking said connection, and means for releasing said member as the key reaches the limit of a full stroke.

20. The combination with a computing device and operating mechanism, having relative lateral movement, of means for locking the operating mechanism against retraction until a complete operation thereof has been effected, and means operated by the relative lateral movement of the computing device and the operating mechanism to release the latter.

21. The combination with a computing device, a key, and an intermediate operating connection; of a traveling carriage, means for locking the connection against retraction, and means operated by the movement of the carriage for releasing said connection.

22. The combination with a computing device and keys; of an intermediate operating connection, key-operated means for locking the connection against premature retraction, and means for applying a power, other than that exerted upon the keys, for moving the locking means to release the connection after a complete key-stroke is assured.

23. The combination with a computing device, a key and an intermediate operating connection; of a traveling carriage, means operated by the key for locking the connection against premature retraction and means operated by the carriage to release the connection when the key has completed its stroke.

24. The combination with a computing device, a key, and an intermediate operating connection; of a traveling carriage, a locking member and a coöperating trip, one of said elements being movable with the carriage, said locking member serving to lock the operating connection against premature retraction and being arranged for release by engagement with the trip.

25. The combination with a computing device, a key, and an intermediate operating connection; of a traveling carriage, a locking member movable with the carriage and arranged to prevent the premature retraction of the operating connection, and a trip arranged to be engaged by the locking member upon the movement of the carriage to release the connection and permit its retraction when the key has completed its stroke.

26. The combination with a computing device, a key, and an intermediate operating connection; of means preventing the premature retraction of said connection, a traveling carriage, and means operated by the carriage for releasing the connection to permit the retraction thereof.

27. The combination with a computing device, a key and an intermediate operating connection; of means preventing the premature retraction of the connection, a traveling carriage the movement of which is controlled by the key, and means operated by the movement of the carriage to release the connection.

28. The combination with a computing device including a series of denominational members; of a key, and operating connections including an actuator, a laterally-movable carriage for moving the actuator to the several denominational members in succession, means for locking the operating connection against premature retraction, and means operative during the advance of the carriage to release the connection and thus permit the retraction thereof during the travel of the actuator from one digit-carrier to another.

29. The combination with a computing device including a series of digit-carriers; of a traveling carriage, an escapement controlling the movement thereof, a key for operating the escapement to permit the feed of the carriage, operating connections between said key and the computing device, means preventing the premature retraction of said connections, and means operative during the feed of the carriage to release the operating connection and thus permit the retraction thereof.

30. The combination with a computing device including a series of digit-carriers; of a traveling carriage, operating mechanism for the computing device movable with the carriage, means for locking an element of said mechanism against premature retraction, and a plurality of trips brought into engagement with said means by the movement of the carriage.

31. The combination with a computing device including a series of denominational members; of a corresponding series of trips, operating mechanism arranged to operate the denominational members in succession, and a locking-arm preventing premature retraction of the operating mechanism and presentable to the trips in succession.

32. The combination with a computing device including a series of denominational members; of a corresponding series of trips, operating mechanism for the computing device movable laterally to engage successive denominational members, a locking-arm for preventing premature retraction of the operating mechanism, and presentable to the trips in succession to effect the release of the operating mechanism and permit the retraction thereof as said mechanism advances from one denominational member to another.

33. The combination with a computing device including a series of denominational members; of a master-wheel therefor, means for dogging the master-wheel against reverse rotation, operating mechanism for the master-wheel including a clutch member and means for holding said clutch member in one position to prevent the retraction of the operating mechanism until a full stroke thereof has been completed.

34. The combination with a computing device including a series of denominational members, and a master-wheel therefor; of means for preventing the reverse rotation of the master-wheel, master-wheel-operating mechanism, a clutch member connecting said mechanism with the master-wheel, and a locking-arm arranged to prevent premature disengagement of the clutch member from the master-wheel, said arm being moved to its effective position by the master-wheel-operating mechanism.

35. The combination with a computing device including a series of denominational members; of a master-wheel therefor, operating mechanism for the master-wheel, a clutch connecting said mechanism with the wheel, a locking-arm preventing premature disengagement of the clutch, means for effecting relative lateral movement of the master-wheel and computing device, and a trip presentable to the locking-arm by such relative movement to effect the release of the clutch.

36. The combination with a computing device; of a master-wheel therefor dogged against reverse rotation, a pinion, a clutch member between the pinion and master-wheel, an operating-lever for rotating the pinion, and a locking-arm operated by the lever to hold the clutch in its engaging position.

37. The combination with a computing device; of a master-wheel therefor dogged against reverse rotation, a pinion, a clutch member between the pinion and master-wheel, an operating-lever for rotating the pinion, a locking-arm operated by the lever to hold the clutch in its engaging position, and a detent for retaining the locking-arm.

38. The combination with a computing device; of a master-wheel therefor, a pinion, a clutch between the pinion and the master-wheel, a locking-arm, means for moving the locking-arm into position to hold the clutch in engagement with the master-wheel, a trip-arm associated with the locking-arm, and a trip coöperating with the trip-arm to move the locking-arm out of the path of the clutch.

39. The combination with a computing device including a series of digit-carriers; of a corresponding series of fixed trips associated with the computing device and having the form of pointed teeth, a laterally-movable carriage, operating mechanism for the master-wheel, a clutch connecting the mechanism and wheel, a locking-lever provided at one end with a locking-arm arranged to engage the clutch, and a trip-arm disposed to engage the trips to move the locking-arm away from the clutch, said locking-lever having a tail-piece operatively related to the master-wheel-operating mechanism.

40. The combination with a computing device, of operating mechanism therefor including a shaft, a series of arms carried by the shaft and having graduated arrangement, keys for operating the arms to transmit motion to the computing device through the medium of the shaft, mechanism controlling the coöperative relation between the keys and arms, and a key for operating said mechanism to destroy such coöperative relation.

41. The combination with a computing device and operating connections therefor; of keys arranged to operate the computing device through said connections, a cam-lever for moving certain elements of said connections to inoperative positions, and a retaining device for holding the cam-lever at either limit of its movement.

42. The combination with a computing device; of a traveling carriage, a key, an operating connection between the key and the computing device, and means movable with the carriage for moving said operating connection to an inoperative position.

43. The combination with a computing device; of a type-writing machine including a traveling carriage, printing mechanism and operating-keys, a motion-transmitting connection between the keys and the computing device, and a lever extended through the top of the carriage and arranged to disconnect said connection from the keys.

44. The combination with a computing device; of a laterally-movable carriage including a casing, a key, operating connections between the key and the computing device, including a rock-shaft suspended from the cover of the carriage-casing and operatively related to the keys, a cam-lever extended through the cover of the carriage-casing and arranged to rock the shaft to break the operative connection between the keys and the computing device, and a spring for holding said cam-lever at either limit of its movement.

45. The combination with a platen and printing mechanism movable opposite the platen; of means controlling such movement to permit the printing of digits in different denominational positions, decimal-spacing means for effecting the exaggeration of such movement to accommodate the decimal-space, and a computing device operative to effect a computation including the printed digits.

46. The combination with a platen and printing mechanism relatively movable; of means controlling such relative movement to permit the printing of digits in different denominational positions, decimal-spacing means for exaggerating such movement to accommodate the decimal-space, said decimal-spacing means being adjustable to accommodate the varying location of the decimal-point and computing mechanism operatively related to the printing mechanism.

47. The combination with a platen and printing mechanism; of means for effecting the uniform step-by-step advance of one of said elements, a computing device and decimal-spacing means adjustable relative to the platen, to effect the spacing of the movable element over the decimal-point of any column on the work-sheet.

48. The combination with a platen, and printing mechanism movable thereover; of means for feeding the printing mechanism in the direction of letter-spacing, decimal-spacing means for automatically exaggerating the movement of the printing mechanism to accommodate the decimal-space, a computing device including a series of digit-carriers, and actuating mechanism therefor, movable with the printing mechanism.

49. The combination with a platen and printing mechanism mounted to travel thereover; of an escapement controlling the letter-space movement of the printing mechanism, decimal-spacing mechanism for automatically operating the escapement to effect an exaggerated feed of the printing mechanism to accommodate the decimal-space, a computing device, and a laterally-movable actuator, the position of which, relative to the computing device, is controlled by the escapement.

50. The combination with a platen and movable printing mechanism; of an escapement controlling the letter-space movements of the latter, means for operating the escapement to effect an exaggerated feed of the printing mechanism, said means being brought into operation by the movement of said printing mechanism, a computing device, and an actuator therefor, arranged for advance with the printing mechanism.

51. The combination with a platen and movable printing mechanism; of an escapement controlling the letter-space movements of the latter, decimal-spacing means for effecting the exaggerated movement of the printing mechanism, said decimal-spacing means including coöperating elements one of which is mounted independently of the printing mechanism and a computing device mounted independently of the printing mechanism and operated thereby.

52. The combination with a platen and a type-writing machine mounted to travel thereover; of an escapement controlling the letter-space movements of the machine, decimal-spacing means including a trip mounted independently of the machine, means operated by the trip to space the machine over the decimal-point, a computing device, and an actuator therefor movable with the machine in the direction of letter-spacing.

53. The combination with a platen and a type-writing machine mounted to travel thereover; of an escapement controlling the letter-space movements of the machine, a trip adjustable transversely of the platen to position it with reference to any desired column on a work-sheet, means brought into engagement with said trip by the movement of the machine to operate the escapement, for the purpose of effecting an exaggerated feed of the machine to accommodate the decimal-space, a computing device adjustable to different positions, and an actuator therefor movable with the traveling machine.

54. The combination with a platen and a type-writing machine mounted to travel thereover; of an escapement mounted on the machine and controlling the letter-space movements thereof, a trip-arm operatively related to the escapement to effect an exaggerated feed of the machine a trip for operating the trip-arm, a computing device, and actuating mechanism presentable to the computing device by the letter-space movement of the machine.

55. The combination with a platen and a type-writing machine mounted to travel thereover; of an escapement movable with the machine, a trip-arm likewise movable therewith and operatively related to the escapement, a trip mounted independently of the machine and arranged to move the trip-arm for the purpose of operating the escapement to effect an exaggerated feed of the machine, a computing device mounted independently of the machine, and an actuator therefor movable with the machine.

56. The combination with a platen; of a machine-frame mounted to travel longitudinally thereof, printing mechanism mounted on said frame to travel transversely of the platen, a trip adjustable upon the machine-frame to dispose it in proper relation to any desired column, an adjustable escapement controlling the letter-space movements of the printing mechanism, a trip-arm operatively related to the escapement and disposed to be presented to the trip by the movement of the printing mechanism to effect the decimal-spacing of the latter, a computing device supported by the frame, and an actuator therefor movable with the printing mechanism.

57. The combination with an escapement comprising a rack member and a pair of dogs coöperating therewith; of means for operating the escapement, decimal-spacing means including an arm operatively related to one of the dogs and means for operating said arm to retard the movement of the dog for the purpose of effecting an exaggerated operation of the escapement, a computing device including a series of digit-carriers, and a laterally-movable actuator therefor controlled, with respect to such lateral movement, by the escapement.

58. The combination with an escapement including a rack member and coöperating dogs; of a trip-arm operatively related to one of the dogs, a trip disposed to engage the trip-arm to retard the movement of the dog into engagement with the rack for the purpose of effecting an exaggerated operation of the escapement, a computing device, and a relatively movable actuator therefor, the relative movement of the computing device and its actuator being controlled by the escapement.

59. The combination with an escapement including a rack member and coöperating dogs; of a rock-shaft coöperatively related to one of the dogs, a trip-arm extending from one end of the rock-shaft, a trip disposed to engage said arm, a computing device, and an actuator having relative movement controlled by the escapement.

60. In a type-writing machine, the combination with a movable carriage; of an escapement mounted on the carriage and including a rack member and coöperating dogs, a rock-shaft also mounted on the carriage and opertively related to one of the dogs, a trip-arm extending from the rock-shaft, a trip mounted independently of the carriage and disposed to engage the trip-arm, a computing device mounted independently of the carriage, and an actuator therefor movable with the carriage.

61. The combination with a type-writing machine; of an escapement including a rotary rack member and a pair of coöperating dogs, an arm extending from one of said dogs, a rock-shaft provided at one end with an arm coöperating with the arm first named, a trip-arm at the opposite end of said rock-shaft a trip disposed to engage the trip-arm, a computing device including a series of digit-carriers, and a master-wheel whose movement, relative to the carriers, is controlled by the escapement.

62. In a type-writing machine, the combination with a carriage and an escapement controlling the movement thereof; of decimal-spacing means including a trip-arm operatively related to the escapement and having a pointed tooth, a trip in the form of a pointed tooth disposed to be engaged by the tooth of the trip-arm and to effect a momentary retardation of an escapement element, a computing device, and a laterally-movable master-wheel controlled in its lateral advance by the escapement.

63. The combination with a platen, and printing mechanism for printing several columns, each including a series of denominations on a work-sheet supported by the platen, of a bodily-movable computing device, and locating means in the path of said device to arrest the same for use in connection with any one of several columns.

64. The combination with a computing device, bodily movable to position the same with reference to different columns, and including a series of digit-carriers corresponding to the denominations or orders of a column, and stop mechanism for arresting said computing device to properly locate the same opposite the respective columns.

65. The combination with a computing device, bodily movable to position it with reference to different columns, and including a series of digit-carriers representing the several denominations or orders of a column, of an adjustable locating-stop, mounted independently of the computing device, to arrest the same opposite any desired column.

66. The combination with an adjustable computing device and a traveling carriage, of a stop movable, relative to the computing device, with the carriage, to be thus disposed in position to arrest and properly locate the computing device with reference to one of several columns.

67. The combination with a traveling carriage, printing mechanism, and an adjustable computing device, of a stop for arresting and properly locating the computing device with reference to the printing-point and independently shiftable in the direction of movement of said device.

68. The combination with a traveling carriage, printing mechanism, and an adjustable computing device; of locating means including a stop for arresting the computing device, and stop mechanism for properly locating the carriage and said locating means with reference to the printing-point.

69. The combination with an adjustable computing device, a traveling carriage and printing mechanism; of a computing-device-locating stop movable with the carriage, and tabulating mechanism for locating the carriage to position the stop for the arrest of the computing device at the proper point.

70. The combination with an adjustable computing device, a movable carriage and printing mechanism; of a computing-device-locating stop movable with the carriage, and tabulating mechanism comprising a column-stop and a coöperating catch for locating the carriage.

71. The combination with a platen and printing mechanism mounted to travel thereover; of a computing device adjustable with reference to different columns, and a locating-stop movable with the printing mechanism, and designed to facilitate the location of the computing device.

72. The combination with a platen; of a machine-frame mounted to travel thereover, a computing device adjustable on the frame, a locating-stop for said device, a carriage mounted to travel on the frame, and operating mechanism for said computing device mounted on and movable with the carriage.

73. The combination with a platen; of a type-writing machine comprising a machine-frame and a carriage mounted to travel thereon, a locating-stop mounted on the carriage, and an adjustable computing device mounted on the frame and arranged to be located by said stop.

74. The combination with a platen and a computing device adjustable relative thereto; of a locating-stop movable into and out of the path of said device.

75. The combination with a computing device, operating mechanism therefor, and a traveling carriage supporting the operating mechanism; of a brace extending from the carriage and provided with a roller engaging the computing device.

76. The combination with a computing device including a series of denominational members and transfer mechanism; of operating mechanism presentable to said members in succession, and means for automatically moving the transfer mechanism into engagement with the members, said means being operated during the advance of the operating mechanism from one member to another.

77. The combination with a computing device including a series of denominational members and transfer mechanism; of a traveling carriage movable independently of the computing device and means operated by the movement of said carriage for positively urging the transfer mechanism into engagement with said members.

78. The combination with a computing device including a series of denominational members and transfer mechanism including transfer-dogs; of a traveling carriage, and means operated by the carriage for positively urging the transfer-dogs to their engaging positions.

79. The combination with a computing device including a series of denominational members and transfer-dogs; of a traveling carriage, and a vibrator operated by the carriage to positively urge the dogs to their engaging positions.

80. The combination with a computing device, including a series of denominational members and transfer-dogs; of a vibrator arranged to move the dogs, a traveling carriage, operating mechanism mounted on the carriage and presentable to the denominational members in succession, and means for effecting the movement of the vibrator upon each advance of the carriage.

81. The combination with a computing device, including a series of denominational members and transfer-dogs; of a vibrator disposed to engage the dogs and having a series of projections, and a traveling carriage having a projection disposed to engage the projections on the vibrator to vibrate the latter successively for the purpose of positively urging the dogs into engagement with the denominational members.

82. The combination with a series of denominational members, and locating mechanism therefor normally resisting the movement of the members, of means for urging the locating mechanism to ease certain of the members without interfering with the retention of the others.

83. The combination with a series of denominational members and locating devices coöperating therewith; of means for operating said locating devices in succession to ease the members.

84. The combination with a series of denominational members and locating devices therefor; of means for partially retracting the locating devices to ease the members and for subsequently completing the retraction of said devices.

85. The combination with a series of denominational members and a series of locating devices; of means for effecting the partial retraction of the locating devices in succession to ease the members, and means for completing the retraction of said devices.

86. The combination with a computing device including a series of denominational members and locating devices therefor; of a traveling carriage; and means operated by the carriage for urging the locating devices to ease the members.

87. The combination with a computing device including a series of denominational members and locating devices therefor; of a traveling carriage, and means operated by the carriage for urging the locating devices to ease the members in succession.

88. The combination with a computing device including a series of denominational members and locating devices therefor; of a traveling carriage, and means operated by the carriage for partially retracting the locating devices to ease the carriers and for subsequently effecting the complete withdrawal of said devices from said members.

89. The combination with a computing device including a series of denominational members and a series of locating devices for said members; of a traveling carriage and means movable with the carriage and disposed to engage the locating devices for the purpose of easing the members.

90. The combination with a series of denominational members and locators therefor; of a locator-depressing plate arranged to traverse the series of locators and to depress the same for the purpose of easing the members.

91. The combination with a computing device including a series of denominational members and locating devices therefor; of a traveling carriage and a locator-depressing plate movable with the carriage to engage the locating devices.

92. The combination with a computing device including a series of denominational members and locating devices therefor; of a traveling carriage, a locator-depressing plate movable with the carriage to engage the locating devices, and to partially depress the same, and means for moving said plate to complete the depression of the locating devices.

93. The combination with a computing device including a series of denominational members and a series of locating devices; of a traveling carriage, and a locator-depressing plate operative to depress the locating devices when the carriage is moved in one direction and inoperative during the retraction of the carriage.

94. The combination with a computing device including a series of denominational members and a series of locating devices; of a traveling carriage, a locator-depressing plate mounted on the carriage and movable therewith to effect the partial depression of the locating devices in succession, and a trip device arranged to engage the depressing-plate for the purpose of moving the latter to effect the complete retraction of the locating devices.

95. The combination with a computing device including a series of denominational members and a series of locating devices extending beyond the computing device; of a traveling carriage, a locator-depressing plate movable with the carriage and mounted to swing vertically, and a rigid trip-bar disposed to depress the depressing-plate after the latter has effected the partial depression of the locating devices.

96. The combination with a computing device including a series of denominational members and a series of locating devices extending beyond the computing device; of a traveling carriage a locator-depressing plate movable with the carriage and mounted to swing vertically, and a rigid trip-bar disposed to depress the depressing-plate after the latter has effected the partial depression of the locating devices, said depressing-plate being arranged to ride over the locating devices and under the trip-bar during the movement of the carriage in one direction and to ride under the locating devices during the movement of the carriage in the opposite direction.

97. The combination with a computing device including a series of denominational members and transfer mechanism therefor; of a traveling carriage, and means operated by the carriage for operating the transfer mechanism.

98. The combination with a computing device including a series of denominational members and transfer mechanism therefor; of a traveling carriage, and means operated by the carriage for retracting the transfer mechanism.

99. The combination with a computing device including a series of denominational members and transfer mechanism therefor; of a traveling carriage, means for operating the members, and transfer mechanism, and means operated by the carriage for restoring the transfer mechanism to its normal position.

100. The combination with a computing device including a series of denominational members and transfer mechanism; of means for operating the members and transfer mechanism, a traveling carriage supporting the operating mechanism, and means operated by the retraction of the carriage for restoring the transfer mechanism to its operative position.

101. The combination with a computing device including a series of denominational members and transfer mechanism; of a traveling carriage, and a slide operatively related to the transfer mechanism and disposed for actuation by the carriage.

102. The combination with a computing device including a series of denominational members and transfer-levers each operated by one member to transmit movement to another carrier; of a traveling carriage, member-operating mechanism mounted thereon, and means operated by the carriage for restoring the transfer-levers to their normal positions.

103. The combination with a computing device including a series of denominational members and a series of transfer-levers therefor; of a traveling carriage, a slide operatively related to the transfer-levers and arranged to retract the same, and a slide-actuator movable with the carriage and disposed to engage the slide during the movement of the carriage in one direction.

104. The combination with a computing device including a series of denominational members, a series of transfer-levers therefor; a rocker for retracting the levers, and a slide connected to the rocker; of a traveling carriage, member-operating mechanism movable with the carriage, and a slide-actuator arranged to engage the slide during the retraction of the carriage.

105. The combination with a series of denominational members and transfer mechanism therefor; of operating mechanism for the members, a check device operatively connected to said operating mechanism and arranged to be projected into engagement with the denominational members.

106. The combination with a series of denominational members and transfer mechanism therefor; of operating mechanism for operating the members in succession, and a check device disposed to engage a member of higher order than the one operated to prevent accidental movement thereof.

107. The combination with a series of denominational members and transfer mechanism therefor; of means for operating a member, and a check arranged to engage the next adjacent member just as the operated member reaches its limit of movement.

108. The combination with a series of denominational members and transfer mechanism therefor; of member-operating mechanism presentable to the members in succession, a check device likewise presentable to successive members and arranged to be moved into engagement with the member next adjacent to the one being operated.

109. The combination with a series of denominational members and transfer mechanism therefor; of a traveling carriage, member-operating mechanism movable with the carriage, and a check device likewise movable with the carriage and arranged to engage the members to prevent accidental movement thereof.

110. The combination with a series of denominational members and transfer mechanism therefor; of a traveling carriage, member-operating mechanism movable with the carriage, and a check-slide presentable opposite the members in succession and arranged to be projected into engagement therewith by the member-operating mechanism.

111. The combination with a series of denominational members; of transfer-levers, each of which is arranged to be engaged by one member to effect the movement of another member, and means for slightly dislocating certain of the levers to prevent the accidental movement thereof when the members serving said levers come to rest in the "9" position.

112. The combination with a series of denominational members having projections, and transfer-levers arranged to be moved by engagement with said projections; of means for slightly dislocating certain of the levers to prevent accidental movement thereof by the impact of the projections when the members are brought to rest in the "9" position.

113. The combination with a computing device including a series of denominational members and transfer-levers therefor; of a traveling carriage, and means operated by the carriage for slightly dislocating certain of the transfer-levers to prevent the accidental movement thereof when the members serving the same come to rest in the "9" position.

114. The combination with a computing device including a series of denominational members and transfer-levers therefor provided with extensions; of a traveling carriage, and a lever-depressing arm movable with the carriage and arranged to slightly depress certain of the levers.

115. The combination with a computing device including a series of denominational members, and transfer-levers provided with extensions; of a traveling carriage, and a lever-depressing arm movable with the carriage and arranged to slightly depress all of the levers to the left of the one next adjacent to the actuated member.

116. The combination with a series of denominational members and combined transfer and locking levers therefor; of means for preventing the accidental locking of the member being actuated, said means including a stop arranged to positively retain in its operative position the transfer-lever which serves the member being actuated.

117. The combination with a series of denominational members and transfer-levers therefor; of a traveling carriage, member-operating mechanism movable with the carriage, and a stop-finger likewise movable with the carriage and disposed to engage and positively retain the lever which serves the member being actuated.

118. The combination with a support and a computing device adjustable thereon; of a locking-lever for retaining the computing device in its adjusted positions.

119. The combination with a support; of a computing device adjustable thereon, a locking-lever for retaining the computing device in its adjusted positions, and means for operating the lever.

120. The combination with a support; of a computing device adjustable thereon, locking means for retaining the computing device in its adjusted positions, and an actuator for said locking means located adjacent to the top of the computing device.

121. The combination with a support; of a computing device adjustable thereon, a locking-lever for retaining said device in its adjusted positions, a thumb-screw, and a connection between the thumb-screw and the locking-lever.

122. The combination with a support; of a computing device adjustable thereon, a locking-lever arranged to lock the computing device in its adjusted positions, a thumb-screw, and a push-rod connecting the thumb-screw with the locking-lever.

123. The combination with a computing device, a platen, and printing mechanism, of means for effecting relative step-by-step movement of the platen and printing mechanism, and means for exaggerating such movement to accommodate the decimal-space.

124. The combination with a computing device, a platen, and printing mechanism, of means for effecting relative movement of the computing device and printing mechanism, and automatic means for exaggerating such movement to accommodate the decimal-space.

125. The combination with a platen and printing mechanism, of a computing device, and a stop mounted independently of the computing device and disposed to arrest the same in various positions relative to the platen.

126. The combination with a platen and printing mechanism, of a shiftable computing device, and a stop shiftable to different points and movable into and out of the path of the computing device.

127. The combination with a platen and printing mechanism, of a computing device shiftable relative to the platen, and a stop for arresting the computing device when so shifted said stop being shiftable independently of both the computing device and platen.

128. The combination with a platen and printing mechanism, of a computing device shiftable relative to the platen, a stop shiftable to any point at which it is desired to arrest the computing device and movable into and out of the path of said device.

129. The combination with a platen and printing mechanism, of a computing device, a locating means therefor, and tabulating mechanism for locating said means independently of the computing device.

130. The combination with a platen and printing mechanism, of a computing device shiftable relative to the platen, a locating-stop shiftable to various points independently of the computing device and platen to arrest the computing device in position for use with reference to various columns, and tabulating mechanism for locating said stop.

131. The combination with a platen and printing mechanism, of a computing device, a shiftable stop shiftable in the direction of movement of the computing device and disposed to arrest the same opposite different portions of the platen, and an escapement controlling the movement of said stop.

132. The combination with a platen and printing mechanism, of a shiftable computing device, locating means for said device, and key-controlled means for moving said locating means independently of the computing device.

133. The combination with a computing device, of operating mechanism therefor including a shaft, a series of arms carried by the shaft and having graduated arrangement, printing mechanism including keys arranged to operate the arms to transmit motion to the computing device through the medium of the shaft when the keys are operated to print digits, mechanism controlling the operating relation between the keys and arms, and a key for operating said mechanism to destroy such coöperative relation to permit the printing of the total without operating the computing device.

134. In combination, a platen, printing mechanism, a computing device having denominational members, an actuator therefor, mechanism for causing relative movement of the platen and printing mechanism and also relative movement of the computing device and its actuator, mechanism controlling such relative movement to permit digits to be printed in different denominational positions and to permit corresponding denominational members of the computing device to be rendered operative by the actuator, and automatic means coöperating with said controlling mechanism to permit exaggerated relative movement of the platen and printing mechanism and also of the computing device and its actuator when the decimal-space is reached.

135. In combination, a platen and printing mechanism, relatively movable, a computing device operated by the printing mechanism to add a column of numbers as the numbers are printed, a column-selective device adjustable to different positions to determine the location of the column to be computed, and a denominational selective device for arresting the relative movement of the platen and printing mechanism when the printing-point is opposite the desired denominational order of the column.

136. The combination with a platen, printing mechanism and a computing device having denominational members and arranged to be operated by the printing mechanism, the platen and printing mechanism being relatively movable and the computing device and platen being relatively adjustable, a column-selective stop for determining the relative adjustment of the computing device and platen to determine the location of the column to be computed, and denominational selective mechanism for arresting the relative movement of the platen and printing mechanism when the latter is in proper denominational relation with the column and the computing device.

In testimony that we claim the foregoing as our own we have hereto affixed our signatures in the presence of two witnesses.

CHARLES FREDERICK LAGANKE.
JOHN ASBURY SMITH.

Witnesses:
GEO. C. RUSSELL,
A. R. WARNER.